United States Patent
Ogawa

(10) Patent No.: US 9,146,803 B2
(45) Date of Patent: Sep. 29, 2015

(54) STORAGE APPARATUS, CONTROL APPARATUS, AND STORAGE APPARATUS CONTROL METHOD

(75) Inventor: Yuichi Ogawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 454 days.

(21) Appl. No.: 13/412,711

(22) Filed: Mar. 6, 2012

(65) Prior Publication Data

US 2012/0239968 A1 Sep. 20, 2012

(30) Foreign Application Priority Data

Mar. 18, 2011 (JP) ................................. 2011-061716

(51) Int. Cl.
*G06F 11/00* (2006.01)
*G06F 11/07* (2006.01)
*G06F 11/10* (2006.01)
*G06F 11/14* (2006.01)

(52) U.S. Cl.
CPC ........ *G06F 11/0793* (2013.01); *G06F 11/0727* (2013.01); *G06F 11/1004* (2013.01); *G06F 11/1443* (2013.01)

(58) Field of Classification Search
CPC . G06F 2211/1009; G06F 21/64; G06F 11/00; G06F 11/0772; G06F 13/1673; G06F 3/061; G06F 9/30003; G06F 9/3812; G06F 9/544; G06F 11/16; G06F 11/1658; G06F 11/0727; G06F 11/0793; G06F 11/10–11/1096; G06F 11/1443; G06F 11/1004
See application file for complete search history.

(56) References Cited

U.S. PATENT DOCUMENTS

| 5,235,693 A * | 8/1993 | Chinnaswamy et al. ..... 711/159 |
| 5,627,993 A * | 5/1997 | Abato et al. .................. 711/143 |
| 5,809,228 A * | 9/1998 | Langendorf et al. ............ 714/53 |
| 6,430,103 B2 * | 8/2002 | Nakayama et al. ...... 365/230.03 |
| 2005/0038968 A1 * | 2/2005 | Iwamura et al. ............... 711/162 |
| 2007/0174739 A1 | 7/2007 | Yoshida |
| 2009/0138672 A1 | 5/2009 | Katsuragi et al. |
| 2009/0235113 A1 * | 9/2009 | Shaeffer et al. .................... 714/5 |
| 2009/0327800 A1 * | 12/2009 | Kim ................................ 714/5 |
| 2012/0117323 A1 * | 5/2012 | Cypher et al. ................ 711/118 |

FOREIGN PATENT DOCUMENTS

| JP | 2000-020398 | 1/2000 |
| JP | 2001-318766 | 11/2001 |
| JP | 2001-318836 A | 11/2001 |
| JP | 2006-338731 A | 12/2006 |
| JP | 2007-179085 A | 7/2007 |
| JP | 2008-46685 A | 2/2008 |
| JP | 2009-129201 A | 6/2009 |

OTHER PUBLICATIONS

Japanese Office Action mailed Sep. 16, 2014 for corresponding Japanese Patent Application No. 2011-061716, with Partial Translation, 6 pages.

* cited by examiner

Primary Examiner — Jason Bryan
(74) Attorney, Agent, or Firm — Fujitsu Patent Center

(57) ABSTRACT

In a storage apparatus a control section writes, at the time of updating at least a part of first data stored in a first storage area by at least a part of second data, the second data to a second storage area other than the first storage area. In addition, the control section determines whether or not a write error occurs. When the write error does not occur, the control section combines the first data and the second data.

11 Claims, 17 Drawing Sheets

FIG. 5

| CONTROL REGISTER | 116a1 |
|---|---|
| MODE | |
| DMA SIZE | |
| DMA DESTINATION ADDRESS | |
| MERGE LEADING ADDRESS | |
| MERGE FINAL ADDRESS | |
| WRITE CACHE LEADING ADDRESS A | |
| WRITE CACHE LEADING ADDRESS B | |
| WRITE CACHE SIZE | |

FIG. 6

| CACHE MANAGEMENT TABLE  112a31 |
|---|
| LEADING ADDRESS |
| FLAG |
| DISK NUMBER |
| LEADING LBA |
| USE LBA BITMAP |

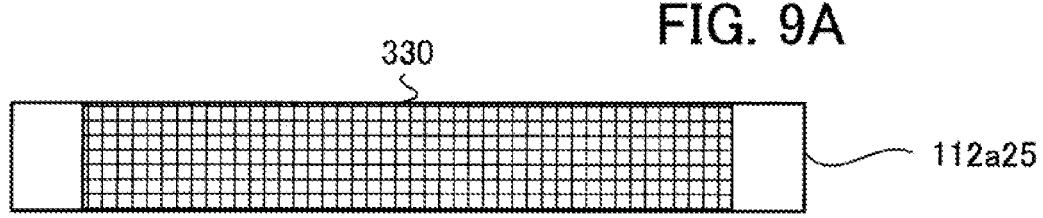
FIG. 9A
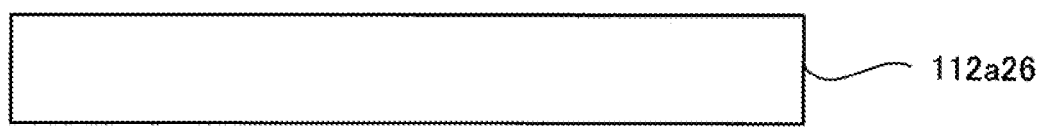
FIG. 9B
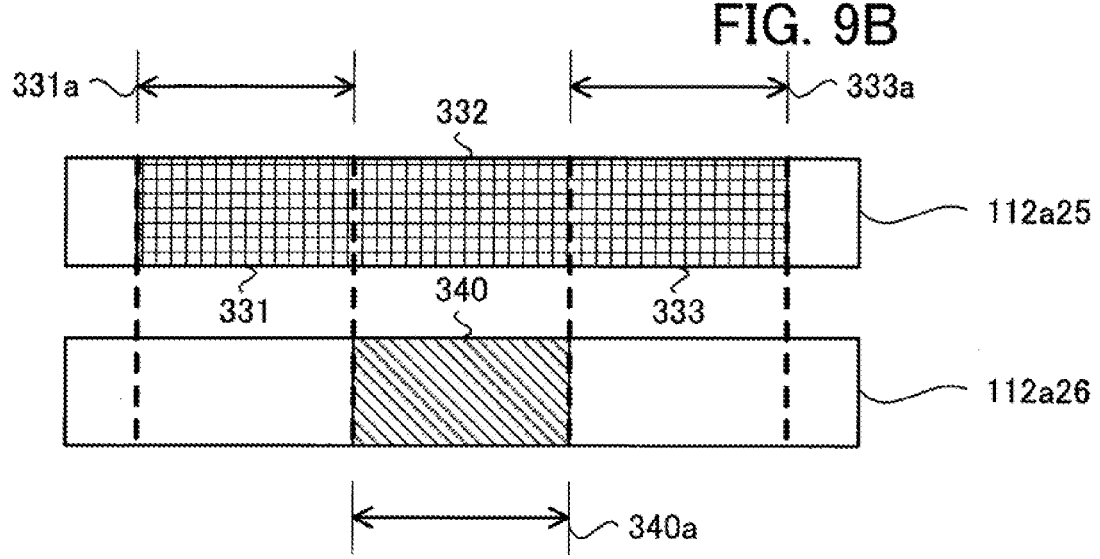
FIG. 9C
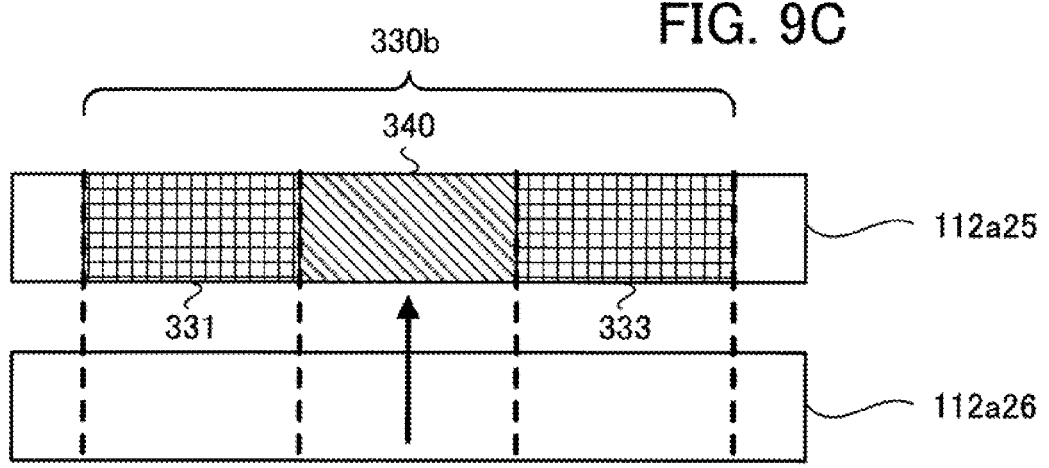

FIG. 10A
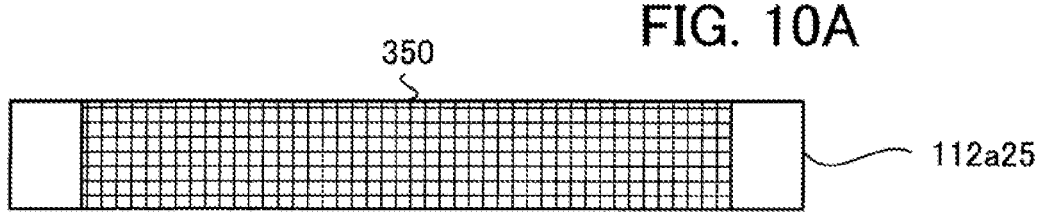
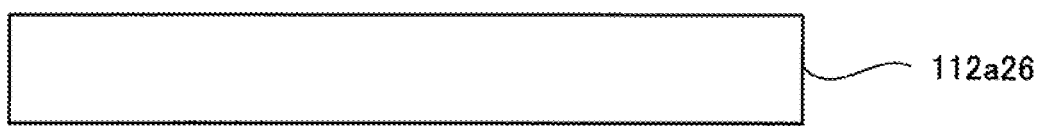
FIG. 10B
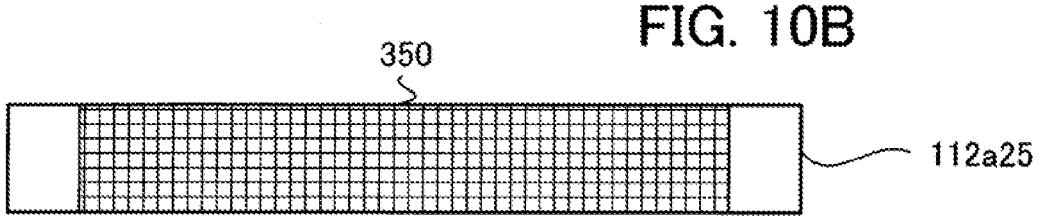
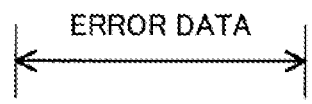
FIG. 10C
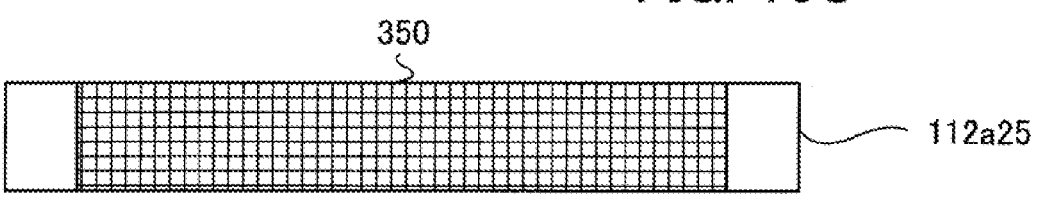

STORAGE APPARATUS, CONTROL APPARATUS, AND STORAGE APPARATUS CONTROL METHOD

CROSS-REFERENCE TO RELATED APPLICATION

This application is based upon and claims the benefit of priority of the prior Japanese Patent Application No. 2011-061716, filed on Mar. 18, 2011, the entire contents of which are incorporated herein by reference.

FIELD

The embodiments discussed herein are related to a storage apparatus, a control apparatus, and a storage apparatus control method.

BACKGROUND

With the progress and spread of information technology, storage apparatus which use storage mediums, such as magnetic disks, optical disks, or semiconductor memories, and which can read out data from or write data to the storage mediums have widely been used. The use of a storage apparatus makes it easy to write, read out, update, or manage a large amount of data.

The following techniques regarding writing data in a storage apparatus are known.

Japanese Laid-open Patent Publication No. 2000-20398.
Japanese Laid-open Patent Publication No. 2001-318766.

It is assumed that when a part or the whole of data is updated by overwriting in a storage apparatus, an error occurs in data for update due to a mismatch or the like. In this case, the error in the data for update may be reflected in data after the overwriting.

SUMMARY

According to an aspect of the present invention, a storage apparatus includes a control section which writes, at the time of updating at least a part of first data stored in a first storage area by at least a part of second data, the second data to a second storage area other than the first storage area, which determines whether or not a write error occurs, and which combines, at the time of the write error not occurring, the first data and the second data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a control register in the second embodiment;
FIG. 6 indicates a cache management table in the second embodiment;
FIGS. 9A through 9C illustrate operation in the second embodiment performed at the time of overwriting previous write data with subsequent write data to combine them;
FIGS. 10A through 10C illustrate operation in the second embodiment performed when an error occurs at the time of writing subsequent write data.

DESCRIPTION OF EMBODIMENTS

Figure 1:
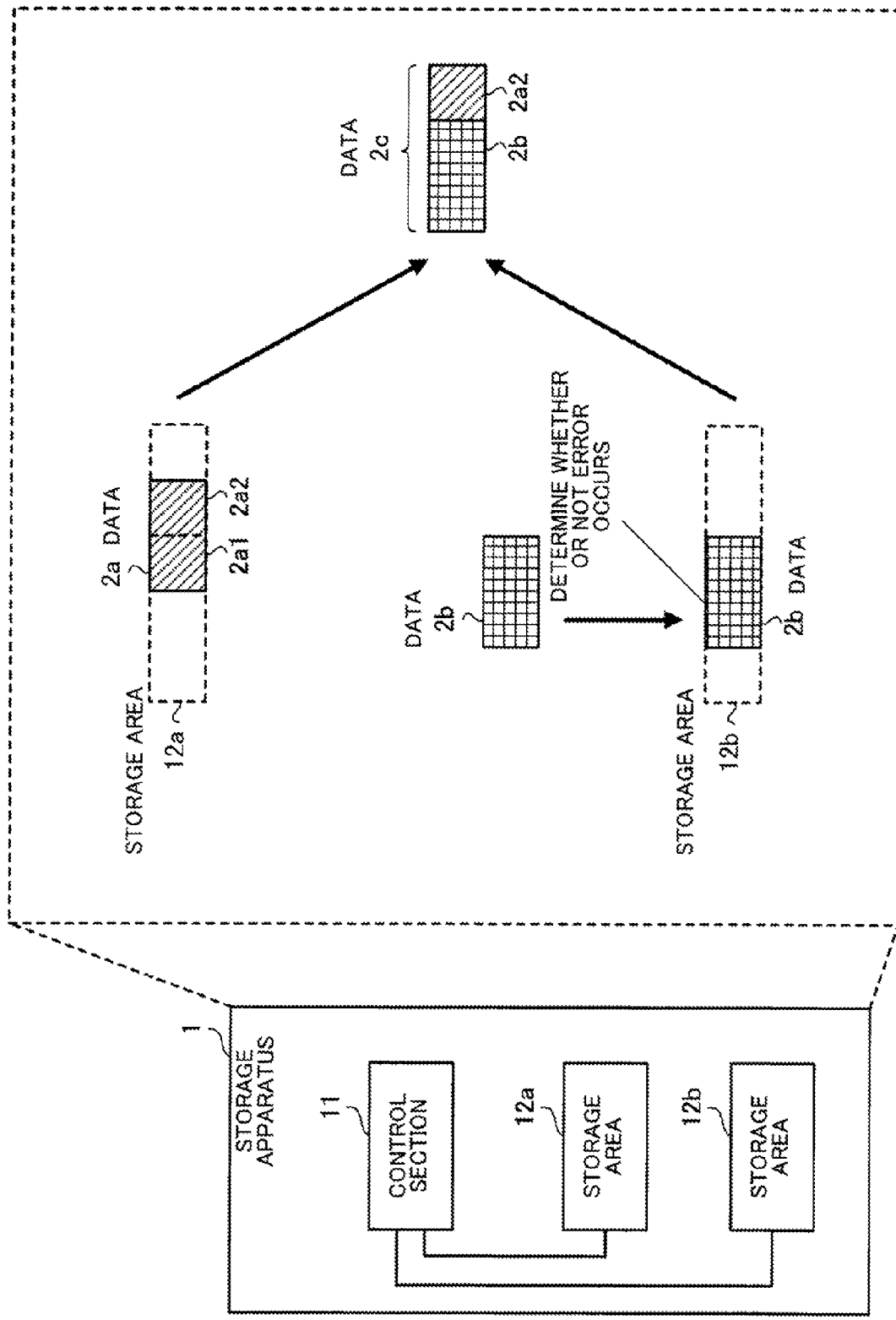
FIG. 1 illustrates a storage apparatus according to a first embodiment.

Embodiments will now be described with reference to the accompanying drawings, wherein like reference numerals refer to like elements throughout.

First Embodiment

FIG. 1 illustrates a storage apparatus according to a first embodiment. A storage apparatus 1 according to this embodiment includes a control section 11, a storage area 12a (first storage area), and a storage area 12b (second storage area).

If at least a part of data 2a (first data) stored in the storage area 12a is updated by at least a part of data 2b (second data), the control section 11 writes the data 2b to the storage area 12b other than the storage area 12a. The data 2a and the data 2b are used for, for example, updating the same update object data. After update is performed by the use of the data 2a, update is performed by the use of the data 2b. A portion of the update object data updated by the data 2a may overlap at least in part with a portion of the update object data updated by the data 2b. That is to say, if the update object data is updated by the data 2a, at least a part of the portion of the update object data updated by the data 2a may be updated again by the data 2b. It is assumed that the data 2a includes an update portion 2a1 at which the data 2a overlaps with the data 2b, and a differential portion 2a2 other than the update portion 2a1. In FIG. 1, it is assumed that the update portion 2a1 included in the data 2a is updated by the data 2b. In addition, the control section 11 determines whether or not a write error occurs. When the control section 11 determines that a write error does not occur, the control section 11 combines the data 2a and the data 2b. As a result, when the control section 11 updates the data 2a by the data 2b, the control section 11 does not overwrite the data 2a directly with the data 2b. That is to say, the control section 11 temporarily writes the data 2b to the storage area 12b. When a write error does not occur, the control section 11 combines the data 2a and the data 2b. By doing so, the control section 11 generates data 2c. Accordingly, even when an error occurs at the time of writing the data 2b to the storage area 12b, it is possible to avoid overwriting the data 2a with the data 2b which is error data.

Furthermore, when a write error does not occur, the control section 11 may perform a combination process 1 (first combination process) for writing the data 2b to the storage area 12a in order to combine the data 2a and the data 2b. With the combination process 1 the update portion 2a1 of the data 2a is overwritten with the data 2b to perform update. By doing so, the data 2a and the data 2b are combined and the data 2c is generated.

Moreover, when a write error does not occur, the control section 11 may perform a combination process 2 for writing the differential portion 2a2 of the data 2a other than the update portion 2a1 to the storage area 12b in order to combine the data 2a and the data 2b. With the combination process 2 the differential portion 2a2 of the data 2a other than the update portion 2a1 is added to the data 2b to generate the data 2c.

In addition, when a write error does not occur, the control section 11 may compare an amount (first writing amount) of writing performed in the case of the combination process 1 with an amount (second writing amount) of writing performed in the case of the combination process 2. In this case, the control section 11 can select the combination process 1 or 2 on the basis of a comparison result and perform the selected combination process. The control section 11 may select one of the combination processes 1 and 2 which is the smaller in writing amount on the basis of the comparison result, and perform the selected combination process.

The storage area 12a stores the data 2a. The storage area 12b is a free area. When the control section 11 writes the data 2b to the storage area 12b, the control section 11 determines whether or not an error occurs. If an error does not occur at the time of the data 2b being written to the storage area 12b, then the data 2a and the data 2b are combined. Even if an error occurs at the time of the data 2b being written to the storage area 12b, the data 2b is written not to the storage area 12a which stores the data 2a but to the storage area 12b. Therefore, the data 2a is not updated by the data 2b which is error data, and is held.

In the first embodiment, as has been described, the control section 11 updates the data 2a stored in the storage area 12a by the data 2b. At this time the control section 11 writes the data 2b to the storage area 12b other than the storage area 12a, and determines whether or not a write error occurs. When the control section 11 determines that a write error does not occur, the control section 11 combines the data 2a and the data 2b. This can prevent data from being updated at data update time by data including an error.

Second Embodiment

The storage apparatus 1 illustrated in FIG. 1 has the function of avoiding updating data by error data. An embodiment in which this function is applied to a storage apparatus 100 including a group of storage devices that make up RAID (Redundant Arrays of Inexpensive Disks) will now be described as a second embodiment.

Figure 2:
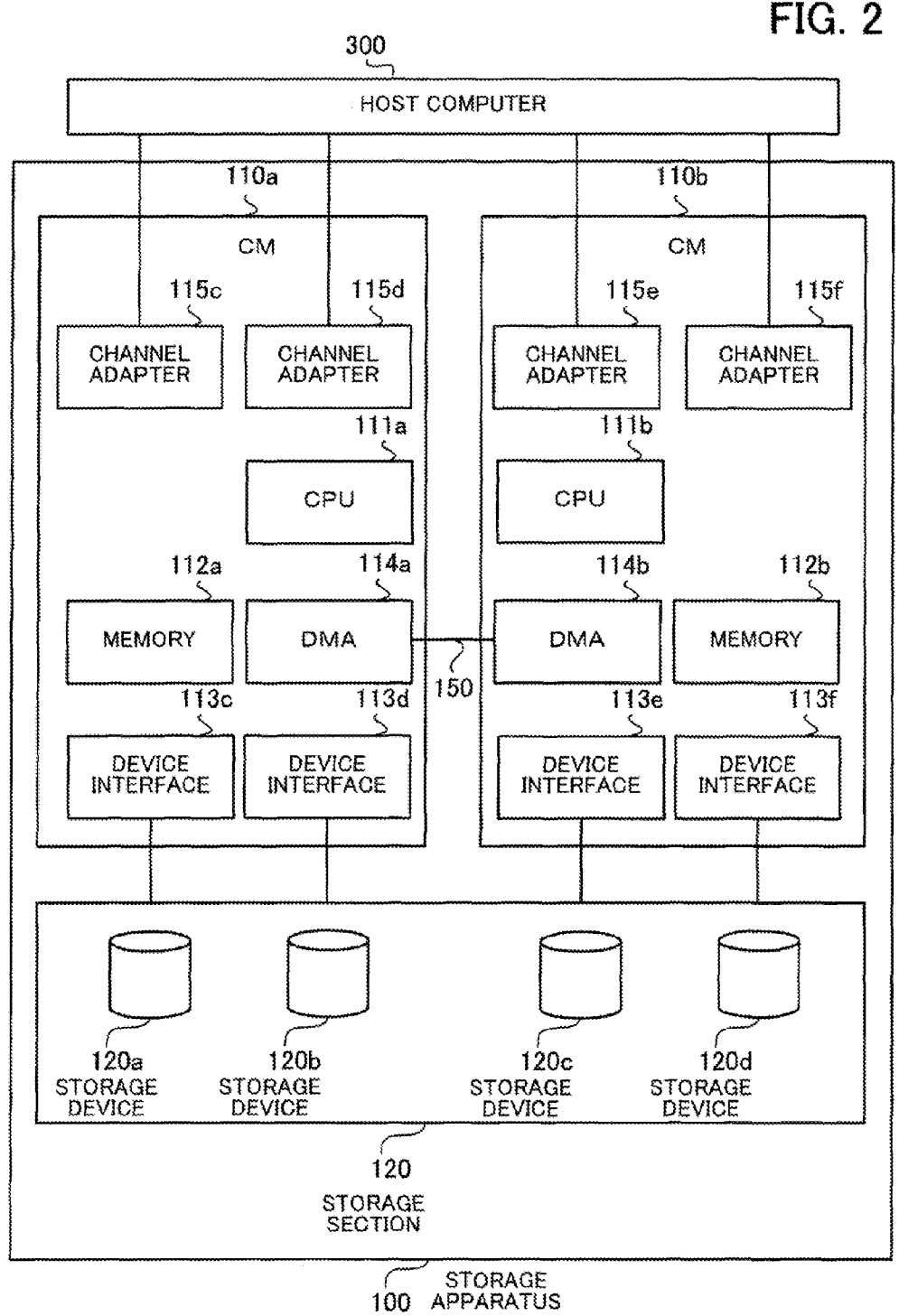
FIG. 2 illustrates the hardware configuration of a storage apparatus according to a second embodiment.

FIG. 2 illustrates the hardware configuration of a storage apparatus according to a second embodiment. A storage apparatus 100 includes CMs (Controller Modules) 110a and 110b which control the whole of the storage apparatus 100 and storage devices 120a, 120b, 120c, and 120d.

The storage apparatus 100 inputs data to or outputs data from the plurality of storage devices described later. Each of the plurality of storage devices is, for example, a hard disk drive. The storage apparatus 100 has the function of realizing a RAID level such as RAID0, RAID1, RAID2, RAID3, RAID4, RAID5, or RAID6. The whole of storage areas realized by a plurality of storage devices forms a RAID group and each RAID group is managed as one storage device.

A host computer 300 is a computer for business processing. The host computer 300 is connected to the storage apparatus 100 via a SAN (Storage Area Network) using Fiber Channel so that the host computer 300 can perform data communication with the storage apparatus 100. The host computer 300 saves data used for business processing in or reads out data used for business processing from the storage apparatus 100.

The CM 110a includes a CPU (Central Processing Unit) 111a, a memory 112a, DIs (Device Interfaces) 113c and 113d, a DMA (Direct Memory Access) 114a, and channel adapters 115c and 115d.

The CPU 111a performs a process in accordance with an OS (Operating System) or the like and exercises various kinds of control. In addition, the CPU 111a manages resources such as the memory 112a, the channel adapters 115c and 115d, and the storage devices 120a, 120b, 120c, and 120d.

The memory 112a stores control data which the CPU 111a needs for controlling the storage apparatus 100. In addition, the memory 112a temporarily stores write data which is transmitted from the host computer 300 and which is stored in the storage devices 120a through 120d and read data which is read out from the storage devices 120a through 120d in response to a read request transmitted from the host computer 300 and which is transmitted to the host computer 300.

The DIs 113c and 113d control connection to the storage devices 120a through 120d.

The transfer of data is performed directly between the DMA 114a and the CM 110b via a bus 150 under the control of firmware. The DMA 114a is connected to a DMA 114b by the bus 150. Data is transferred between the DMAs 114a and 114b via the bus 150.

The channel adapters 115c and 115d control connection between the host computer 300 and the CM 110a. For example, the channel adapter 115c accepts a request from the host computer 300 and controls connection between the host computer 300 and the CM 110a. Each of the CMs 110a and 110b includes a plurality of (two in the example of FIG. 2) channel adapters.

Communication between the channel adapter 115c or 115d and the host computer 300 is performed via a SAN using Fiber Channel. However, communication between the channel adapter 115c or 115d and the host computer 300 may be performed by a method other than Fiber Channel. In addition, when communication between the channel adapter 115c or 115d and the host computer 300 is performed, the storage apparatus 100 may be installed at a place remote from the host computer 300 by the use of a dedicated line or a VPN (Virtual Private Network).

Furthermore, each of the CMs 110a and 110b functions as a control unit and can be installed in or removed from the storage apparatus 100. The CM 110b includes a CPU 111b, a memory 112b, device interfaces 113e and 113f, a DMA 114b, and channel adapters 115e and 115f. The structure of the CM 110b is the same as that of the CM 110a, so its description will be omitted.

The storage devices 120a through 120d are hard disk drives which can make up RAID, and store user data transmitted from the host computer 300. It is not necessary to store user data in one hard disk drive. User data may be stored in a plurality of hard disk drives. Furthermore, one hard disk drive may store plural pieces of user data. Moreover, nonvolatile semiconductor memories such as SSDs (Solid State Drives), magnetic storage other than hard disk drives, optical disks, or other storage mediums which can store data can be used as the storage devices 120a through 120d. Magnetic storage can be a hard disk drive (HDD), a magnetic tape, or the like. An optical disk can be a DVD, a DVD-RAM, a CD-ROM/RW, or the like.

FIG. 2 illustrates the two CMs 110a and 110b. The CM 110a includes the two device interfaces 113c and 113d and the CM 110b includes the two device interfaces 113e and 113f. In addition, the CM 110a includes the two channel adapters 115c and 115d and the CM 110b includes the two channel adapters 115e and 115f. However, any number of CMs, device interfaces, or channel adapters may be used.

Furthermore, in FIG. 2 the one host computer 300 is connected to the storage apparatus 100. However, a plurality of host computers may be connected to the storage apparatus 100.

Moreover, an extension apparatus (not illustrated) which includes a control section and a storage device and which is controlled by the CMs 110a and 110b may be connected to the storage apparatus 100.

By adopting the above hardware configuration, processing functions in the second embodiment can be realized.

Figure 3:
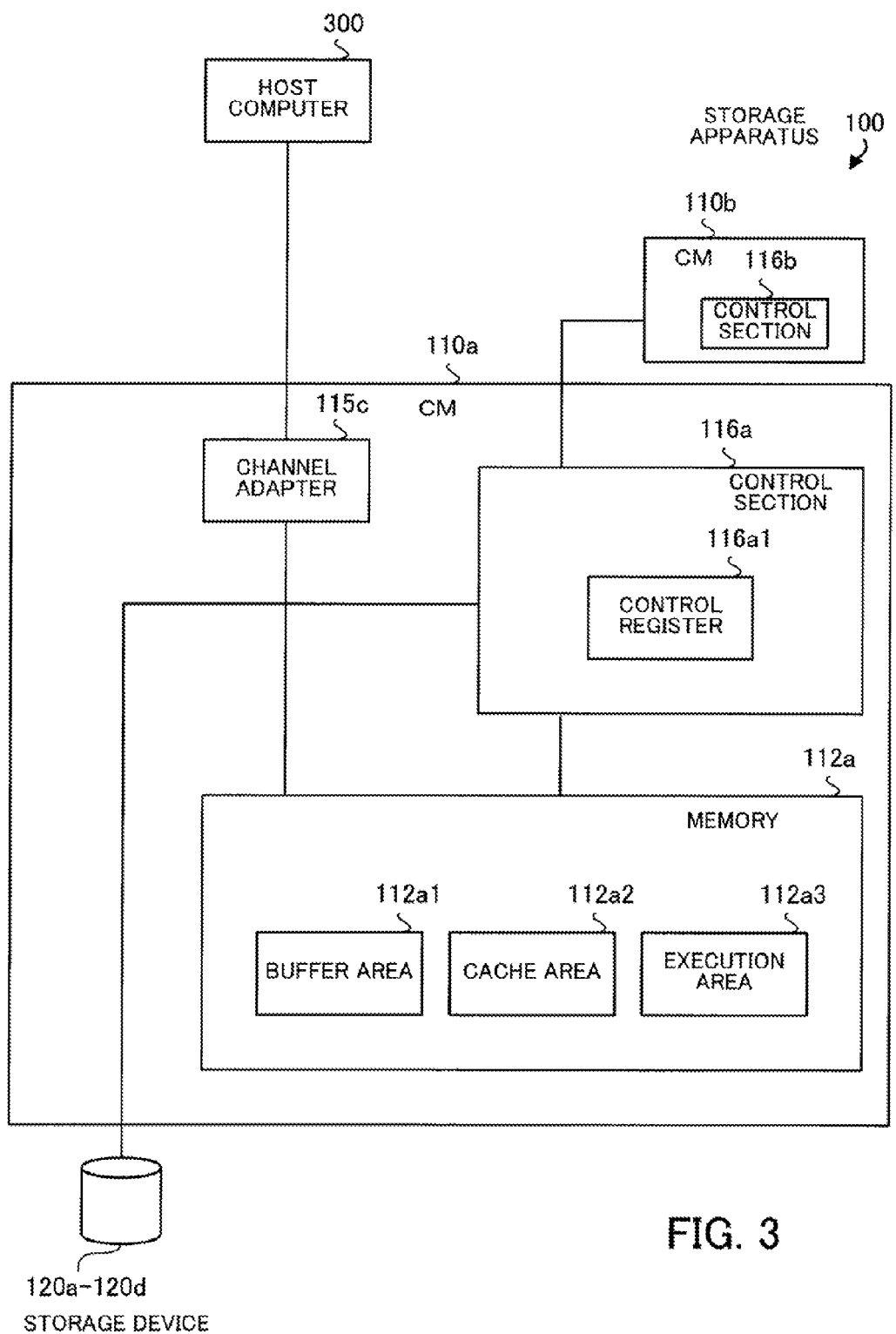
FIG. 3 is a block diagram indicative of the functions of the storage apparatus according to the second embodiment.

FIG. 3 is a block diagram indicative of the functions of the storage apparatus according to the second embodiment.

The storage apparatus 100 according to the second embodiment includes the CMs 110a and 110b and the storage devices 120a through 120d. The CM 110a includes the memory 112a, the channel adapter 115c, and a control section 116a. The memory 112a includes a buffer area 112a1, a cache area 112a2, and an execution area 112a3. The control section 116a includes a control register 116a1. Data can be transferred between the CMs 110a and 110b.

The CM 110b includes a control section 116b. The control section 116b functions as a second control section. The CM 110a will now be described. However, the CMs 110a and 110b have the same structure and therefore have the same functions. Accordingly, description of the CM 110b will be omitted.

The CM 110a controls the storage apparatus 100. For example, the CM 110a controls reading out data based on transmission, reception, or the like between an upper apparatus, such as the host computer 300, and the storage apparatus 100 from or writing data based on transmission, reception, or the like between an upper apparatus, such as the host computer 300, and the storage apparatus 100 to the storage devices 120a through 120d. The CM 110a functions as a controller.

The memory 112a stores data read out from or written to the storage devices 120a through 120d by the CM 110a, control data used by the control section 116a for exercising control, or the like.

The buffer area 112a1 temporarily stores data transmitted from the host computer 300 or data to be transmitted to the host computer 300.

The cache area 112a2 temporarily stores write data which is transmitted from the host computer 300 and which is to be written to the storage devices 120a through 120d until writing the write data to the storage devices 120a through 120d is completed. In addition, the cache area 112a2 temporarily stores read data which is read out from the storage devices 120a through 120d and which is to be transmitted to the host computer 300. It is assumed that previous write data (first data) is stored in a storage area of the cache area 112a2. Furthermore, it is assumed that subsequent write data (second data) used for updating the previous write data is transmitted from the host computer 300. In this case, it is assumed that the previous write data and the subsequent write data are used for, for example, updating the same data and that update by the subsequent write data is performed after update by the previous write data. In addition, it is assumed that a portion of the update object data updated by the previous write data overlaps at least in part with a portion of the update object data updated by the subsequent write data. That is to say, if the update object data is updated by the subsequent write data, at least a part of a portion of the update object data updated by the previous write data is updated again by at least a part of the subsequent write data. The cache area 112a2 functions as a cache section.

When write data is stored in the cache area 112a2, the control section 116a refers to cache management information stored in a cache management table described later in FIG. 6, and determines whether or not there is previous write data having an overlap. To be concrete, the control section 116a refers to cache management information for each storage area of the cache area 112a2, checks a flag included in the cache management information, and determines whether or not cache data for write data is stored in each storage area of the cache area 112a2. When the control section 116a determines on the basis of a flag that cache data for write data is stored in each storage area, the control section 116a determines on the basis of a disk number and a leading LBA included in cache management information whether or not among the write data stored in the cache area 112a2, there is write data for which update object data is the same as update object data for write data written to the cache area 112a2. If the control section 116a determines on the basis of a disk number and a leading LBA that there is write data for which update object data is the same as the update object data for the write data written to the cache area 112a2, then the control section 116a determines, on the basis of a use LBA bitmap included in cache management information corresponding to a storage area of the cache area 112a2 in which the write data for which the update object data is the same as the update object data for the write data written to the cache area 112a2 is stored, whether or not at least a part of a portion of the update object data updated by the write data written to the cache area 112a2 overlaps with at least a part of a portion of the update object data updated by the write data for which the update object data is the same as the update object data for the write data written to the cache area 112a2. If the control section 116a determines that at least a part of a portion of the update object data updated by the write data written to the cache area 112a2 overlaps with at least a part of a portion of the update object data updated by the write data for which the update object data is the same as the update object data for the write data written to the cache area 112a2, then the write data written to the cache area 112a2 is referred to as subsequent write data and the write data for which the update object data is the same as the update object data for the subsequent write data is referred to as previous write data.

Next, if the control section 116a updates at least a part of the previous write data stored in the cache area 112a2 by at least a part of the subsequent write data, the control section 116a writes the subsequent write data to a storage area of the cache area 112a2 other than the storage area in which the previous write data is stored. When the control section 116a writes the subsequent write data to the cache area 112a2, the control section 116a writes the subsequent write data to a free storage area other than the storage area in which the previous write data is stored. To be concrete, the control section 116a refers to the cache management table, determines whether or not storage areas of the cache area 112a2 are free, selects a free storage area, and stores the subsequent write data. That is to say, the control section 116a refers to the cache management table, acquires a flag for each storage area of the cache area 112a2, and determines whether or not the flag is invalid (data is not written). If the control section 116a determines that a flag for a storage area is invalid, then the control section 116a selects the storage area for storing the subsequent write data. On the other hand, if the control section 116a determines that the flag for the storage area is valid (data is written), then the control section 116a determines whether or not a flag for the next storage area of storage areas other than the storage area in which the previous write data is stored is invalid. The control section 116a then stores the subsequent write data in a selected storage area.

The execution area 112a3 stores control data, such as the cache management table described later in FIG. 6, used for controlling the CM 110a, the storage apparatus 100, and the like. The execution area 112a3 functions as a management information storage section.

The channel adapter 115c adds a check code to data which is transmitted from the host computer 300 and which is to be written to the cache area 112a2, and writes the data to the buffer area 112a1. The channel adapter 115c functions as an addition section.

The control section 116a controls the transfer of data to the buffer area 112a1 or the cache area 112a2 in the CM 110a or the transfer of data between the CMs 110a and 110b. At this time data is divided into packets and is transferred in the storage apparatus 100. In addition, when the control section 116a writes the subsequent write data to the cache area 112a2, the control section 116a determines whether or not a write error occurs. When the control section 116a determines that a write error does not occur, the control section 116a combines the previous write data and the subsequent write data to generate combined data. The control section 116a updates the update object data for the previous write data and the subsequent write data which is stored in the storage devices 120a through 120d by the combined data.

As a result, when the control section 116a updates the previous write data by the subsequent write data, the control section 116a does not overwrite the previous write data directly with the subsequent write data. That is to say, the control section 116a writes the subsequent write data to a storage area other than the storage area in which the previous write data is stored. If an error does not occur at this time, the control section 116a combines the previous write data and the subsequent write data. Accordingly, even when an error occurs at the time of writing the subsequent write data to a storage area of the cache area 112a2, it is possible to avoid overwriting the previous write data with the subsequent write data which is error data. The control section 116a can be realized by the CPU 111a and the DMA 114a.

Furthermore, when a write error does not occur, the control section 116a may perform a combination process (first combination process) for writing the subsequent write data to the storage area in which the previous write data is stored in order to combine the previous write data and the subsequent write data. The combination process 1 is performed for updating the previous write data by the subsequent write data and combining them.

In addition, when a write error does not occur, the control section 116a may perform a combination process 2 for writing a differential portion of the previous write data other than an update portion to the storage area in which the subsequent write data is stored in order to combine the previous write data and the subsequent write data. The combination process 2 is performed for adding the differential portion of the previous write data other than the update portion to the subsequent write data.

Moreover, when a write error does not occur, the control section 116a may compare a combination amount (first writing amount) at the time of performing the combination process 1 with a combination amount 2 (second writing amount) at the time of performing the combination process 2. In this case, the control section 116a can select the combination process 1 or 2 on the basis of a comparison result and perform the selected combination process. The control section 116a may select one of the combination processes 1 and 2 which is the smaller in writing amount on the basis of the comparison result, and perform the selected combination process.

In addition, when the control section 116a reads out write data stored in the buffer area 112a1 and then writes subsequent write data to the cache area 112a2, the control section 116a determines on the basis of a check code added by the channel adapter 115c whether or not an error occurs. Under the control of the control section 116a, the check code is added by the channel adapter 115c to the subsequent write data transmitted from the host computer 300 and then the subsequent write data is written to the buffer area 112a1. After that, when the control section 116a writes the subsequent write data to the cache area 112a2, the control section 116a determines on the basis of the check code whether or not an error occurs. As a result, when the control section 116a (DMA 114a) transfers the write data from the buffer area 112a1 to the cache area 112a2, the control section 116a can determine whether or not an error occurs in the write data. Alternatively, the control section 116a may determine on the basis of the check code whether or not an error occurs in the write data written to the buffer area 112a1.

The control section 116a has already determined that an error does not occur in the write data written to the cache area 112a2. On the other hand, the control section 116a does not determine whether or not an error occurs in the write data stored in the buffer area 112a1. As a result, the possibility of the occurrence of an error in the write data stored in the buffer area 112a1 is higher than the possibility of the occurrence of an error in the write data stored in the cache area 112a2. That is to say, the reliability of the write data stored in the buffer area 112a1 is probably lower than that of the write data stored in the cache area 112a2. Accordingly, if previous write data is written to the cache area 112a2 and subsequent write data is stored in the buffer area 112a1, the reliability of the previous write data is probably higher than that of the subsequent write data.

Therefore, when the control section 116a combines the previous write data written to the cache area 112a2 and the subsequent write data, the control section 116a writes the subsequent write data to a storage area of the cache area 112a2 other than a storage area in which the previous write data is stored. When the control section 116a writes the subsequent write data, the control section 116a determines whether or not an error occurs. If an error does not occur at the time of writing the subsequent write data, then the control section 116a combines the previous write data and the subsequent write data by the combination process 1 or 2. In addition, even if an error occurs at the time of writing the subsequent write data to the cache area 112a2, the previous write data is held in the storage area other than the storage area to which the subsequent write data is written. As a result, even if an error occurs at the time of writing the subsequent write data, it is possible to avoid updating the previous write data by error data. Furthermore, it is unnecessary to, for example, request the host computer 300 to retransmit the previous write data. Accordingly, an increase in the number of processes can be controlled.

The storage devices 120a through 120d are hard disk drives or the like which make up RAID and store data transmitted from the host computer 300 or data to be transmitted to the host computer 300. The storage devices 120a through 120d function as a storage section.

Moreover, the control section 116a transmits write data transmitted from the host computer 300 to the control section 116b. When the control section 116b receives previous write data and subsequent write data, the control section 116b combines the previous write data and the subsequent write data transmitted to generate combined data. This is the same with the control section 116a.

In addition, when a write error occurs in the subsequent write data, the control section 116a does not combine the previous write data and the subsequent write data. At this time the control section 116a deletes the subsequent write data and informs the host computer 300 about the occurrence of the error. Furthermore, when a write error occurs, the control section 116a may acquire combined data generated by the control section 116b.

The control register 116a1 stores control data used by the DMA 114a for controlling write data or read data. A control register may be included in the DMA 114a.

The storage apparatus 100 according to the second embodiment includes the group of storage devices which make up RAID. However, the storage apparatus 100 according to the second embodiment may include one storage device or groups of storage devices which do not make up RAID. In addition, the storage apparatus 100 may be an information processing apparatus, such as a personal computer or a personal digital assistant, including a storage device.

Furthermore, when the subsequent write data is written to the cache area 112a2 in which the previous write data is stored, the storage apparatus 100 writes the subsequent write data to a free storage area. However, when the subsequent write data is written to a memory or storage medium, such as the buffer area 112a1 or the storage devices 120a through 120d, in which the previous write data is stored, the storage apparatus 100 may write the subsequent write data to a free storage area of the memory or storage medium.

Moreover, a check code is added to write data by the channel adapter 115c. However, a check code may be added by an external apparatus, such as the host computer 300, or another internal component, such as the control section 116a.

Figure 4:
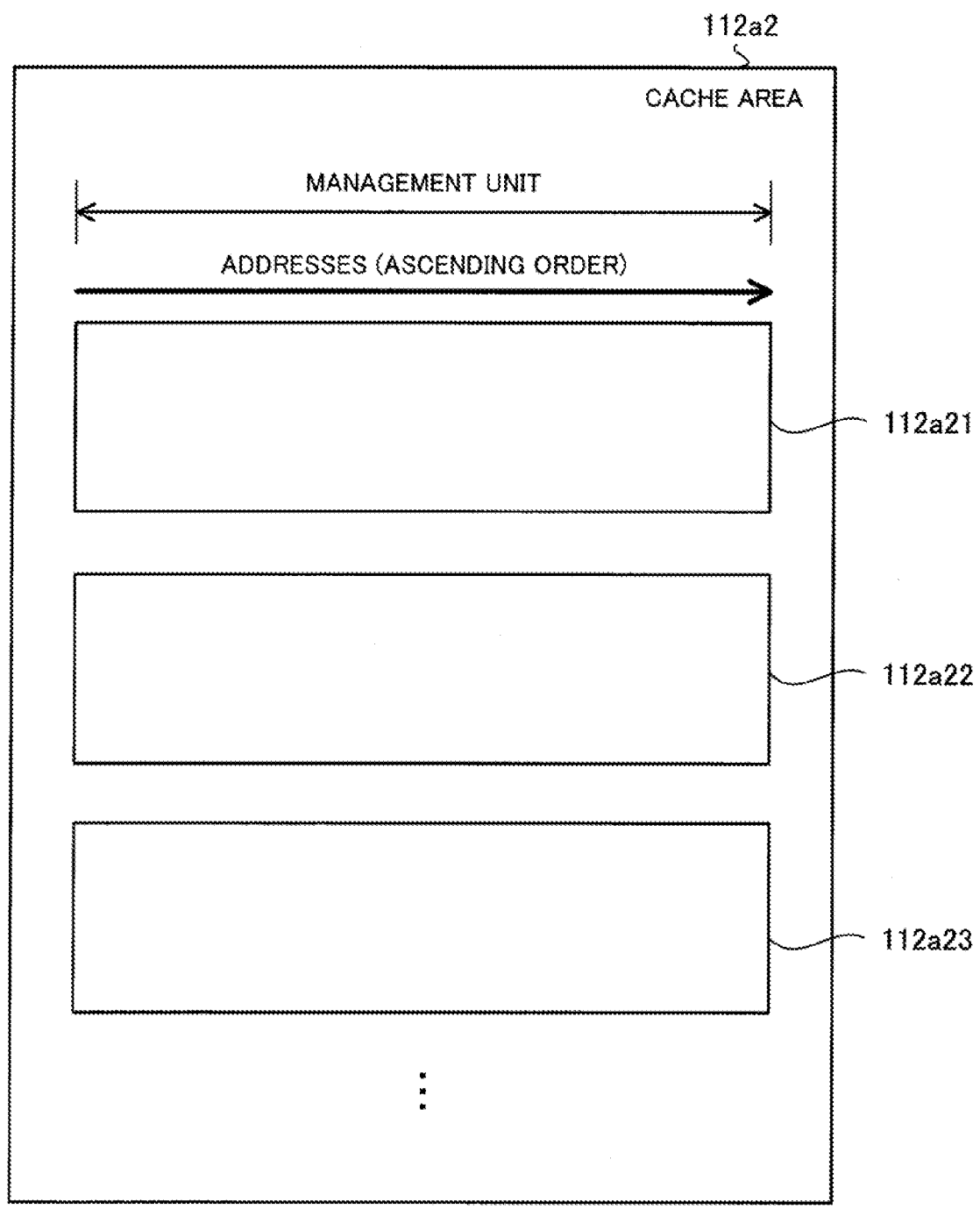
FIG. 4 illustrates a cache area in the second embodiment.

FIG. 4 illustrates the cache area in the second embodiment. FIG. 4 illustrates the cache area 112a2 set in the memory 112a included in the storage apparatus according to the second embodiment.

The cache area 112a2 temporarily stores write data which is transmitted from the host computer 300 and which is to be stored in the storage devices 120a through 120d or read data which is read out from the storage devices 120a through 120d and which is to be transmitted to the host computer 300. In the second embodiment the cache area 112a2 has a storage capacity of, for example, 2G bytes. However, the cache area 112a2 can have any storage capacity. The cache area 112a2 is divided into storage areas 112a21, 112a22, 112a23, and so on each having determined storage capacity (64K bytes, for example) which is the unit of management, and is managed. Each of the storage areas into which the cache area 112a2 is divided is used for temporarily storing write data or read data.

A storage area (storage area 112a21, for example) of the cache area 112a2 is divided into LBAs (Logical Block Addresses) each having determined storage capacity (512 bytes, for example). LBA addresses are set in the storage area 112a21 in ascending order and writing or reading is performed according to LBAs.

FIG. 5 illustrates the control register in the second embodiment. FIG. 5 illustrates the control register 116a1 set in the control section 116a included in the storage apparatus according to the second embodiment.

The control register 116a1 stores control data used by the DMA 114a for controlling write data or read data. "mode", "DMA size", "DMA destination address", "merge leading address", "merge final address", "write cache leading address A", "write cache leading address B", and "write cache size" corresponding to each piece of write data are set in the control register 116a1 illustrated in FIG. 5.

"mode" indicates control mode of the DMA 114a. The CPU 111a sets "mode" before the DMA 114a processes write data. For example, "READ", "WRITE", or "WRITE & MERGE" can be set as "mode".

In the case of the READ mode, the control section 116a receives data transferred from the CM 110b. In the case of the WRITE mode, the control section 116a transfers data from the CM 110a to the CM 110b. In the case of the WRITE & MERGE mode, the control section 116a transfers subsequent write data from the CM 110a to the CM 110b in the WRITE mode and then combines the subsequent write data and previous write data stored in a storage area of the cache area 112a2 of the CM 110a other than a storage area in which the subsequent write data is stored. In addition, the control section 116b receives the subsequent write data transferred from the CM 110a, and then combines the received subsequent write data and the previous write data that is stored in a storage area of a cache area (not illustrated) of the CM 110b other than a storage area in which the subsequent write data is stored and that is transferred in advance from the CM 110a. If there is write data in the cache area 112a2 at least a part of update object data for which overlaps with update object data for new write data, then the CPU 111a sets the WRITE & MERGE mode.

"DMA size" indicates DMA size (number of bytes) at the time of reading or writing by the DMA 114a. The CPU 111a sets "DMA size" before the DMA 114a processes write data.

"DMA destination address" indicates an address of a destination memory used at the time of reading or writing by the DMA 114a. The CPU 111a sets "DMA destination address" before the DMA 114a processes write data.

"merge leading address" is used at the time of combining write data in the WRITE & MERGE mode. If there is previous write data at least a part of update object data for which overlaps with update object data for subsequent write data, "merge leading address" indicates a leading address of a storage area of the cache area 112a2 in which the existing previous write data combined with the subsequent write data is stored. The CPU 111a sets "merge leading address" before the DMA 114a processes write data.

"merge final address" is used at the time of combining write data in the WRITE & MERGE mode. This is the same with "merge leading address". If there is previous write data at least a part of update object data for which overlaps with update object data for subsequent write data, "merge final address" indicates a final address of a storage area of the cache area 112a2 in which the existing previous write data combined with the subsequent write data is stored. The CPU 111a sets "merge final address" before the DMA 114a processes write data.

"write cache leading address A" is used at the time of combining write data in the WRITE & MERGE mode. This is the same with "merge leading address". If there is previous write data at least a part of update object data for which overlaps with update object data for subsequent write data, "write cache leading address A" indicates a leading address of a storage area of the cache area 112a2 in which the existing previous write data is stored. The CPU 111a sets "write cache leading address A" before the DMA 114a processes write data.

"write cache leading address B" is used at the time of combining write data in the WRITE & MERGE mode. This is the same with "merge leading address". If there is previous write data at least a part of update object data for which overlaps with update object data for subsequent write data, "write cache leading address B" indicates a leading address of a storage area of the cache area 112a2 in which the subsequent write data written later is stored. The CPU 111a sets "write cache leading address B" before the DMA 114a processes write data.

"write cache size" is used at the time of combining write data in the WRITE & MERGE mode. This is the same with "merge leading address". "write cache size" indicates the storage capacity of each storage area of the cache area 112a2. The CPU 111a sets "write cache size" before the DMA 114a processes write data.

The control register 116a1 illustrated in FIG. 5 is an example and any item can be set in a control register.

FIG. 6 indicates a cache management table in the second embodiment. A cache management table 112a31 indicated in FIG. 6 is set in the execution area 112a3 of the memory 112a included in the storage apparatus 100 according to the second embodiment. The cache management table 112a31 is used for managing write data in each storage area of the cache area 112a2 of the storage apparatus 100.

The cache management table 112a31 includes "leading address", "flag", "disk number", "leading LBA", and "use LBA bitmap" items. Values set in the above items are associated with one another in the cache management table 112a31 as cache management information for each storage area of the cache area 112a2.

"leading address" indicates a storage area of the cache area 112a2 managed by cache management information. Cache management information is set for a storage area of the cache area 112a2 on a one-to-one basis.

"flag" indicates whether write data or read data stored in a storage area is valid or invalid. For example, if data stored in a storage area is invalid, then "0" is set. If the data stored in the storage area is valid, then "1" is set. "flag" may also indicate whether data stored in a storage area is write data or read data. In this case, for example, if data stored in a storage area is invalid, then "0" is set. If the data stored in the storage area is valid and is write data, then "1" is set. If the data stored in the storage area is valid and is read data, then "2" is set.

"disk number" indicates the storage device 120a, 120b, 120c, or 120d which stores write data or read data stored in a storage area.

"leading LBA" indicates a leading address of a storage area corresponding to the management unit in the storage devices 120a through 120d in which data corresponding to write data or read data stored in a storage area is stored.

"use LBA bitmap" indicates a valid portion of write data or read data stored in a storage area. In the second embodiment it is assumed that data access is performed by 512 bytes. Accordingly, "use LBA bitmap" may be 1-bit bitmap information every 512-byte actual data.

The cache management table 112a31 indicated in FIG. 6 is an example and any item can be set in a cache management table.

Figure 7A:
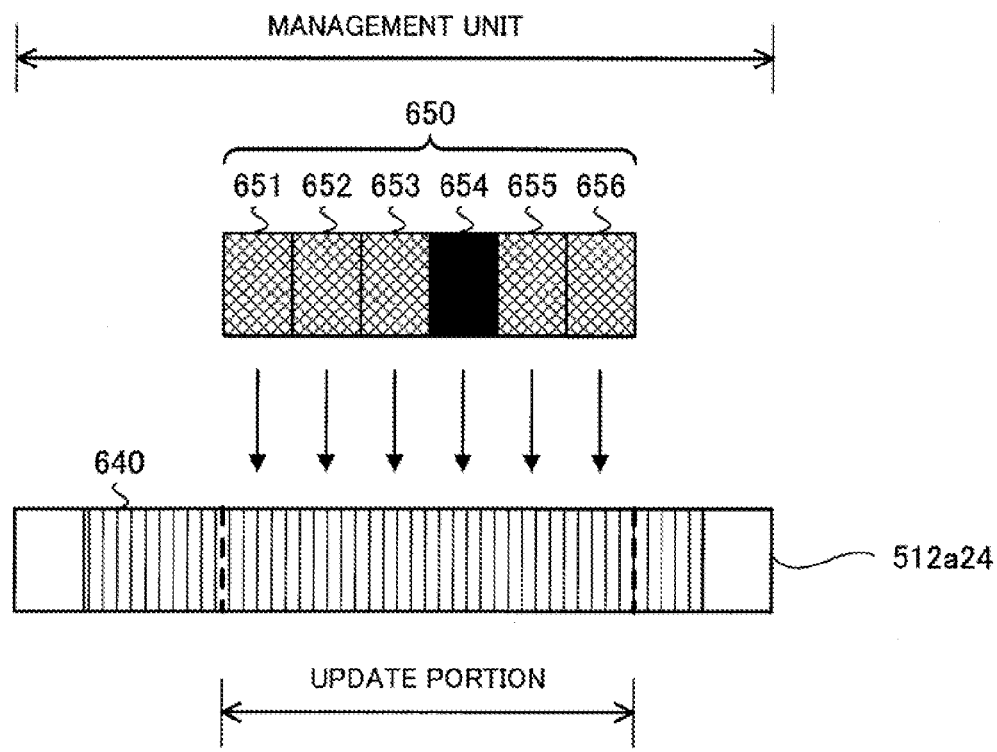
FIGS. 7A and 7B illustrate error detection in a write process by a storage apparatus taken as an example for comparison.
Figure 7B:
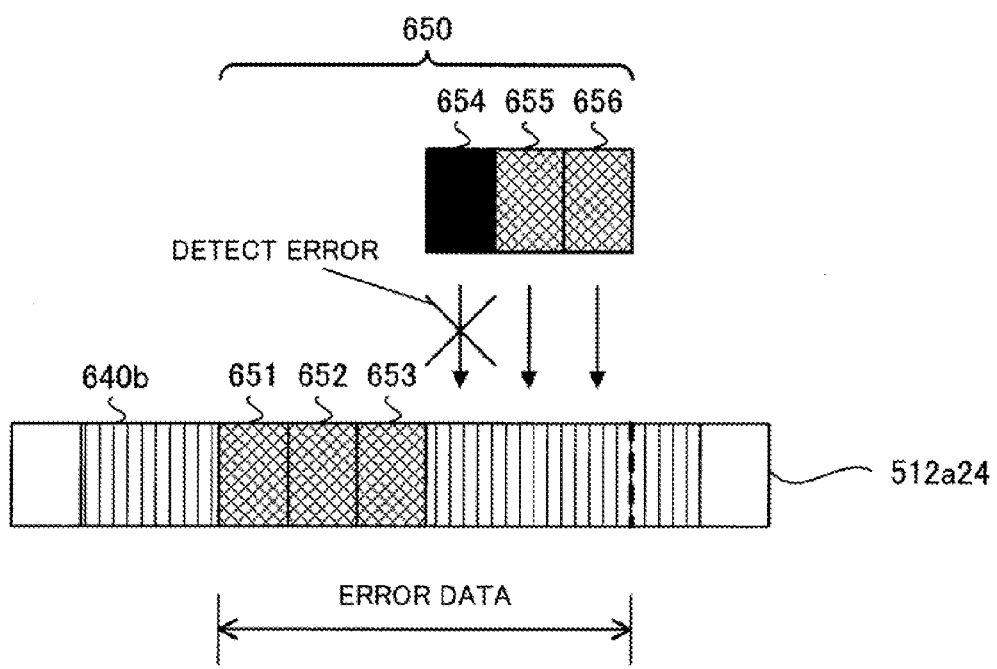

FIGS. 7A and 7B illustrate error detection in a write process by a storage apparatus taken as an example for comparison. FIG. 7A illustrates a case where in a storage apparatus taken as an example for comparison, subsequent write data 650 is written to a storage area 512a24 to which previous write data 640 has been written by the packet. FIG. 7B illustrates a case where when the subsequent write data 650 is written to the storage area 512a24 by the packet in the storage apparatus taken as an example for comparison, a packet 654 including an error is detected. In FIGS. 7A and 7B, a case where the storage apparatus taken as an example for comparison performs a write process and where an error occurs will be described. The storage apparatus taken as an example for comparison includes the storage area 512a24 having determined storage capacity (64K bytes, for example) which is the unit of management.

In the storage apparatus taken as an example for comparison, as illustrated in FIG. 7A, it is assumed that the previous write data 640 is written from a buffer area to the storage area 512a24 of a cache area. In this case, it is assumed that the subsequent write data 650 is written to the storage area 512a24 and that a part (update portion in FIG. 7A) of the previous write data 640 is overwritten with the subsequent write data 650. The subsequent write data 650 is divided into packets 651, 652, 653, 654, 655, and 656 of determined size and is transferred, written, or read out by the packet. It is assumed that the packet 654 includes error data.

In the storage apparatus taken as an example for comparison, as illustrated in FIG. 7B, the packets 651, 652, 653, 654, 655, and 656 into which the subsequent write data 650 is divided are then written in order to the storage area 512a24. As a result, the portion of the previous write data 640 is updated. It is assumed that data after the update is data 640b. As stated above, the packet 654 includes error data. Accordingly, in the storage apparatus taken as an example for comparison, a DMA detects an error at the time of writing the packet 654 to the storage area 512a24, and stops transferring and writing the subsequent write data 650. At the time when the storage apparatus taken as an example for comparison detects an error in the packet 654, however, the packets 651 through 653 have already been written to the storage area 512a24. In addition, if it is difficult to specify a portion updated by data (packet 654, for example) including an error or to correct the specified portion by acquiring it again or if the reliability of the entire subsequent write data 650 in a portion (packet 654) of which an error occurs is lowly evaluated, then a portion of the data 640b updated by the subsequent write data 650 or the whole of a portion to be updated may be treated as error data.

On the other hand, the storage apparatus 100 according to the second embodiment writes subsequent write data in advance to a storage area other than a storage area in which previous write data is stored, and detects whether or not an error occurs. If an error does not occur, the storage apparatus 100 combines the previous write data and the subsequent write data. This can prevent the previous write data from becoming error data.

Figure 8A:
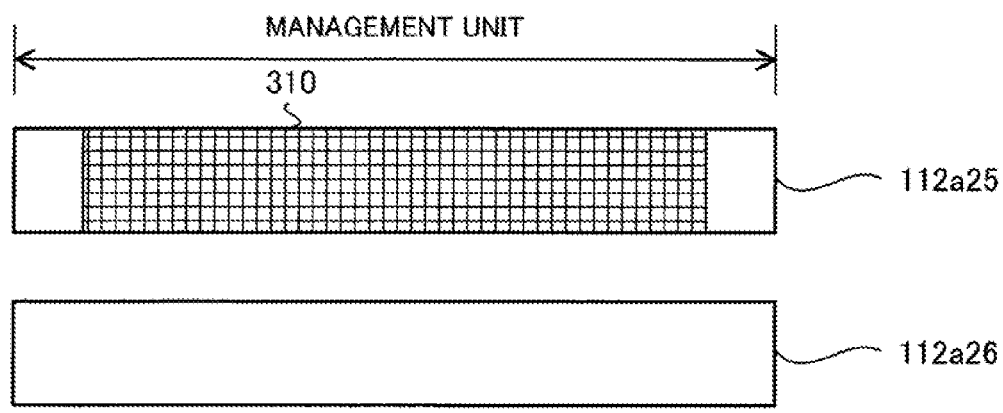
FIGS. 8A through 8C illustrate operation in the second embodiment performed at the time of adding differential portions of previous write data to subsequent write data to combine the previous write data and the subsequent write data.
Figure 8B:
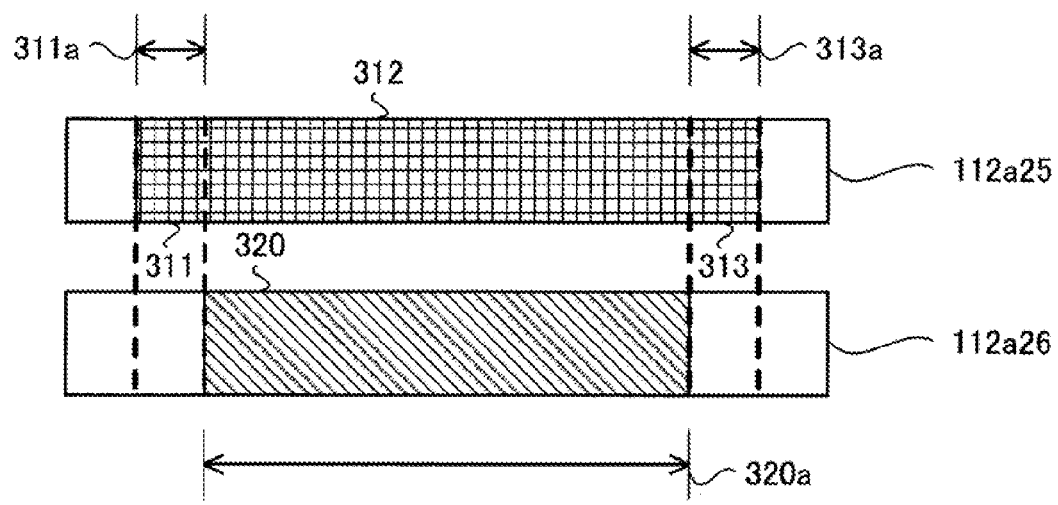
Figure 8C:
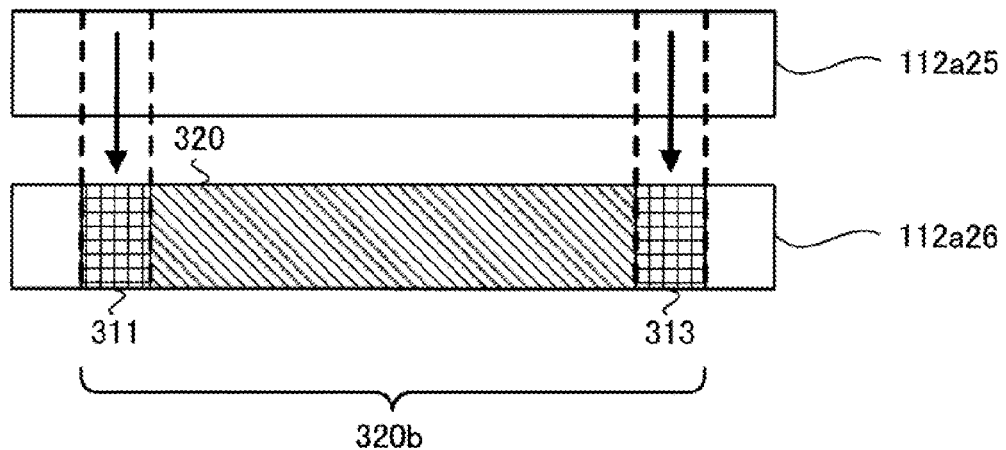

FIGS. 8A through 8C illustrate operation in the second embodiment performed at the time of adding differential portions of previous write data to subsequent write data to combine the previous write data and the subsequent write data. FIG. 8A illustrates operation performed in the storage apparatus 100 according to the second embodiment at the time of writing previous write data 310 to a storage area 112a25 of the cache area 112a2. FIG. 8B illustrates operation performed in the storage apparatus 100 according to the second embodiment at the time of writing subsequent write data 320 to a storage area 112a26 of the cache area 112a2 and comparing combination amounts. FIG. 8C illustrates operation performed in the storage apparatus 100 according to the second embodiment at the time of adding, on the basis of a result obtained by comparing the combination amounts, differential data 311 and 313 which are differential portions of the previous write data 310 to the subsequent write data 320 to combine the previous write data 310 and the subsequent write data 320. Each of the storage areas 112a25 and 112a26 has determined storage capacity (64K bytes, for example) which is the unit of management.

As illustrated in FIG. 8A, it is assumed that the storage apparatus 100 receives the previous write data 310 transmitted from the host computer 300 and that the storage apparatus 100 writes the previous write data 310 to the storage areas 112a25. In this case, the storage apparatus 100 sets cache management information for the storage area 112a25 on the basis of writing the previous write data 310. It is assumed that the storage area 112a26 is a free storage area at this point of time. Whether or not each storage area of the cache area 112a2 is a free storage area is indicated by a flag included in cache management information corresponding to each storage area. The control section 116a determines on the basis of, for example, a flag included in cache management information for each storage area of the cache area 112a2 whether or not each storage area is a free storage area. The control section 116a can write data to a free storage area, such as the storage area 112a25, on the basis of a determination result.

Next, as illustrated in FIG. 8B, it is assumed that the storage apparatus 100 normally writes the subsequent write data 320 transmitted from the host computer 300 to the storage area 112a26 and that an error does not occur. In this case, the storage apparatus 100 sets cache management information for the storage area 112a26 on the basis of writing the subsequent write data 320. In addition, the storage apparatus 100 calculates a combination amount 1 which is a writing amount at the time of performing a combination process 1. The combination process 1 is a process for writing the subsequent write data 320 to the storage area 112a25 in which the previous write data 310 is stored. As a result, the combination amount 1 is data size 320a indicative of the size of the subsequent write data 320. Furthermore, the storage apparatus 100 calculates a combination amount 2 which is a writing amount at the time of performing a combination process 2. The combination process 2 is a process for writing differential data 311 and 313 other than a portion of the previous write data 310 updated by the subsequent write data 320 to the storage area 112a26 in which the subsequent write data 320 is stored. As a result, the combination amount 2 is the total of data sizes 311a and 313a indicative of the size of the differential data 311 and 313, respectively, of the previous write data 310. The storage apparatus 100 then compares the combination amount with the combination amount 2 and performs the combination process 1 or 2 on the basis of a comparison result. In this case, it is assumed that the combination amount 2 is smaller than the combination amount 1.

The combination amount 2 is smaller than the combination amount 1 as a result of the comparison of the combination amounts. Therefore, as illustrated in FIG. 8C, the storage apparatus 100 then performs the combination process 2. That is to say, the storage apparatus 100 writes the differential data 311 and 313 to the storage area 112a26 in which the subsequent write data 320 is stored to combine the subsequent write data 320 and the differential data 311 and 313. By doing so, combined data 320b is generated. Furthermore, when the storage apparatus 100 updates the storage area 112a26, the storage apparatus 100 makes the cache management information set on the basis of writing the previous write data 310 invalid and corrects the cache management information set on the basis of writing the subsequent write data 320. As a result, the previous write data 310 is deleted from the storage area 112a25. In addition, when data stored in the cache area 112a2 is written to the storage devices 120a through 120d, update object data stored in the storage devices 120a through 120d is overwritten with the combined data 320b stored in the storage area 112a26.

FIGS. 9A through 9C illustrate operation in the second embodiment performed at the time of overwriting previous write data with subsequent write data to combine them. FIG. 9A illustrates operation performed in the storage apparatus 100 according to the second embodiment at the time of writing previous write data 330 to the storage area 112a25 of the cache area 112a2. FIG. 9B illustrates operation performed in the storage apparatus 100 according to the second embodiment at the time of writing subsequent write data 340 to the storage area 112a26 of the cache area 112a2 and comparing combination amounts. FIG. 9C illustrates operation performed in the storage apparatus 100 according to the second embodiment at the time of overwriting, on the basis of a result obtained by comparing the combination amounts, the previous write data 330 with the subsequent write data 340 to combine them.

As illustrated in FIG. 9A, it is assumed that the storage apparatus 100 receives the previous write data 330 transmitted from the host computer 300 and that the storage apparatus 100 writes the previous write data 330 to the storage areas 112a25. In this case, the storage apparatus 100 sets cache management information for the storage area 112a25 on the basis of writing the previous write data 330. It is assumed that the storage area 112a26 is a free storage area at this point of time.

Next, as illustrated in FIG. 9B, it is assumed that the storage apparatus 100 normally writes the subsequent write data 340 transmitted from the host computer 300 to the storage area 112a26 and that an error does not occur. In this case, the storage apparatus 100 sets cache management information for the storage area 112a26 on the basis of writing the subsequent write data 340. In addition, the storage apparatus 100 calculates combination amounts 1 and 2. In FIG. 9B, the combination amount 1 is size 340a of the subsequent write data 340. The combination amount 2 is the total of sizes 331a and 333a of differential data 331 and 333, respectively. The storage apparatus 100 then compares the combination amount 1 with the combination amount 2 and performs a combination process 1 or 2 on the basis of a comparison result. In this case, it is assumed that the combination amount 1 is smaller than the combination amount 2.

The combination amount 1 is smaller than the combination amount 2 as a result of the comparison of the combination amounts. Therefore, as illustrated in FIG. 9C, the storage apparatus 100 then performs the combination process 1. That is to say, the storage apparatus 100 writes the subsequent write data 340 to the storage area 112a25 in which the previous write data 330 is stored to combine them. By doing so, combined data 330b is generated. Furthermore, when the storage apparatus 100 updates the storage area 112a25, the storage apparatus 100 makes the cache management information set on the basis of writing the subsequent write data 340 invalid. In addition, when the storage apparatus 100 updates the storage area 112a25, the storage apparatus 100 properly corrects the cache management information set on the basis of writing the previous write data 330 according to an effective address range of the combined data 330b. As a result, the subsequent write data 340 is deleted from the storage area 112a26. In addition, when data stored in the cache area 112a2 is written to the storage devices 120a through 120d, update object data stored in the storage devices 120a through 120d is overwritten with the combined data 330b stored in the storage area 112a25.

In the storage apparatus 100 according to the second embodiment, as illustrated in FIGS. 8A through 8C and FIGS. 9A through 9C, one of the combination processes 1 and 2 which is smaller in write data amount is performed in this way on the basis of the previous write data and the subsequent write data. As a result, a load on the storage apparatus 100 caused by a combination process can be controlled. Furthermore, by reducing the amount of write data needed for combination, an error at transfer time caused by a write process can be prevented.

FIGS. 10A through 10C illustrate operation in the second embodiment performed when an error occurs at the time of writing subsequent write data. FIG. 10A illustrates operation performed in the storage apparatus 100 according to the second embodiment at the time of writing previous write data 350 to the storage area 112a25 of the cache area 112a2. FIG. 10B illustrates operation performed in the storage apparatus 100 according to the second embodiment in the case of a write error being detected at the time of writing subsequent write data 360 to the storage area 112a26 of the cache area 112a2. FIG. 10C illustrates operation performed in the storage apparatus 100 according to the second embodiment at the time of deleting the subsequent write data 360 in which the error is detected from the storage area 112a26.

As illustrated in FIG. 10A, it is assumed that the storage apparatus 100 receives the previous write data 350 transmitted from the host computer 300 and that the storage apparatus 100 writes the previous write data 350 to the storage areas 112a25. In this case, the storage apparatus 100 sets cache management information for the storage area 112a25 on the basis of writing the previous write data 350. It is assumed that the storage area 112a26 is a free storage area at this point of time.

Next, as illustrated in FIG. 10B, it is assumed that when the storage apparatus 100 writes the subsequent write data 360 transmitted from the host computer 300 to the storage area 112a26, a write error occurs. In this case, the storage apparatus 100 treats all of the subsequent write data 360 written to the storage area 112a26 as error data. In addition, if the subsequent write data 360 which is error data is written, the storage apparatus 100 does not set cache management information for the storage area 112a26.

The subsequent write data 360 written to the storage area 112a26 is error data. Therefore, as illustrated in FIG. 10C, the storage apparatus 100 does not perform data combination. Furthermore, cache management information for the storage area 112a26 is invalid, so update object data stored in the storage devices 120a through 120d is not overwritten with the subsequent write data 360. In addition, the error occurs in the subsequent write data 360, so the storage apparatus 100 gives the host computer 300 notice of the occurrence of the write error in the subsequent write data 360, while holding the previous write data 350 in the storage areas 112a25. The host computer 300 which receives the notice of the occurrence of the write error in the subsequent write data 360 may retransmit the subsequent write data 360. If the subsequent write data 360 is retransmitted before the overwriting of update object data with the previous write data 350 and an error does not occur at the time of writing the retransmitted subsequent write data 360, then the previous write data 350 and the subsequent write data 360 are combined. As a result, when data stored in the cache area 112a2 is written to the storage devices 120a through 120d, the update object data is updated by combined data. If the subsequent write data 360 is not retransmitted, then the update object data stored in the storage devices 120a through 120d is updated by the previous write data 350 stored in the storage area 112a25 when data stored in the cache area 112a2 is written to the storage devices 120a through 120d.

As has been described, in the second embodiment it is assumed that when the subsequent write data is written to the storage area 112a26, an error occurs as illustrated in FIGS. 10A through 10C. In this case, the storage apparatus 100 does not combine the previous write data 350 and the subsequent write data 360 and hold the previous write data 350. The previous write data 350 is not overwritten with the subsequent write data 360 which is error data. As a result, for example, the storage apparatus 100 requests the host computer 300 to retransmit the subsequent write data 360. The storage apparatus 100 then updates the update object data stored in the storage devices 120a through 120d only by the subsequent write data 360. Alternatively, the storage apparatus 100 may combine the previous write data 350 and the subsequent write data 360 and update the update object data stored in the storage devices 120a through 120d by the combined data.

As a result, there is no need to make a request to retransmit the previous write data 350. Therefore, the load on the storage apparatus 100 or the host computer 300 can be reduced.

Figure 11:
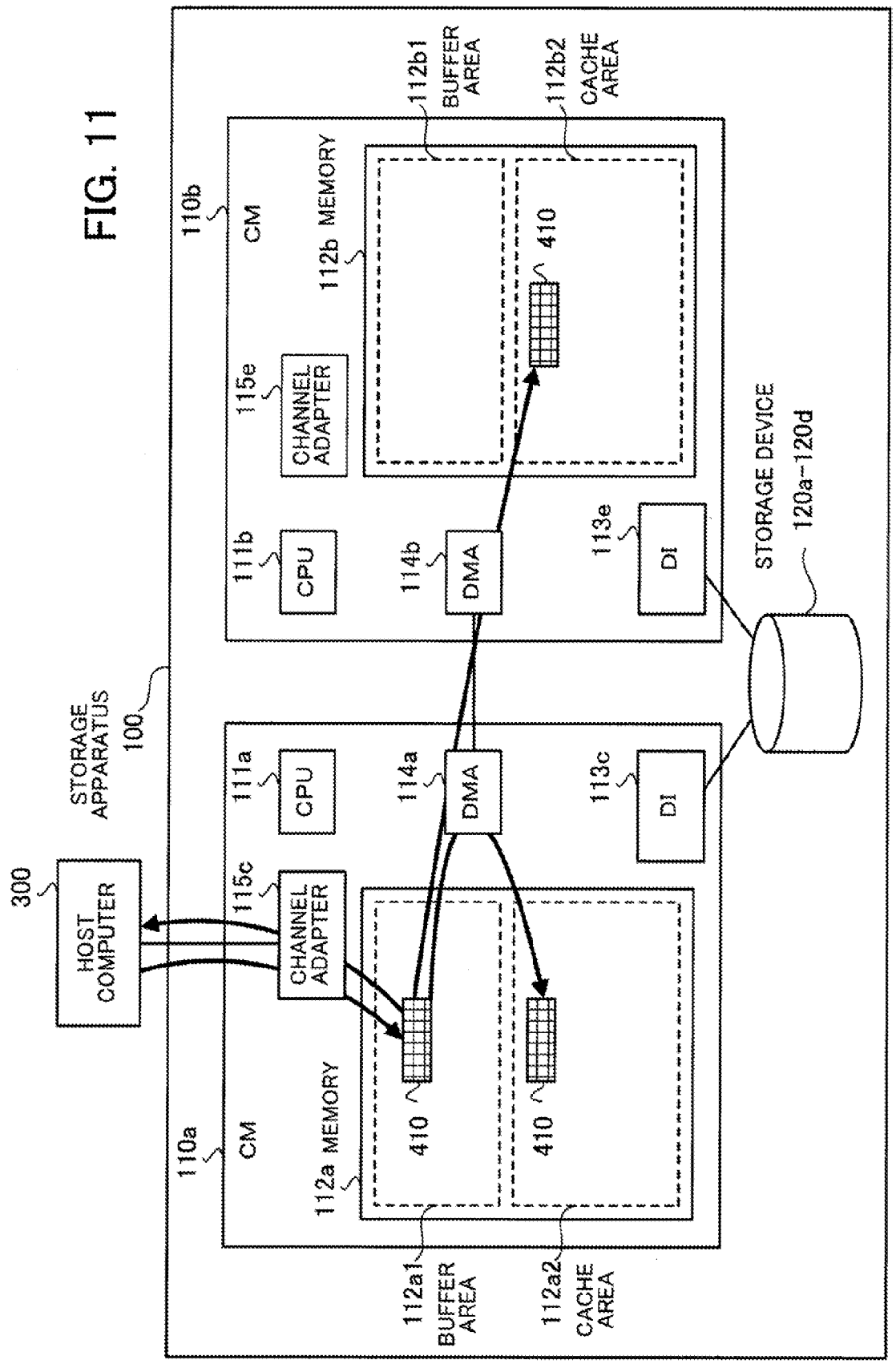
FIG. 11 illustrates operation in the second embodiment performed at the time of writing previous write data transmitted from a host computer to a cache area.

FIG. 11 illustrates operation in the second embodiment performed at the time of writing previous write data transmitted from a host computer to a cache area. As illustrated in FIG. 11, the storage apparatus 100 according to the second embodiment is connected to the host computer 300 and includes the CMs 110a and 110b and the storage devices 120a through 120d. The CM 110a includes the CPU 111a, the memory 112a, the device interface 113c, the DMA 114a, and the channel adapter 115c. The CM 110b includes the CPU 111b, the memory 112b, the device interface 113e, the DMA 114b, and the channel adapter 115e. The memory 112a includes the buffer area 112a1 and the cache area 112a2. The memory 112b includes a buffer area 112b1 and a cache area 112b2. The DMAs 114a and 114b are connected to each other and data can be transferred between them.

As illustrated in FIG. 11, it is assumed that the storage apparatus 100 receives from the host computer 300 write data 410 for updating data stored in the storage devices 120a through 120d. In this case, the storage apparatus 100 adds a check code used for error detection to the received write data 410 by the channel adapter 115c according to packets, and writes the write data 410 to which the check codes are added to the buffer area 112a1. The storage apparatus 100 reads out by the DMA 114a the write data 410 stored in the buffer area 112a1. The storage apparatus 100 determines by the DMA 114a by the use of the check codes added by the channel adapter 115c whether or not an error is detected in the write data 410 read out according to packets. If an error is not detected by the DMA 114a, then the storage apparatus 100 writes the write data 410 to the cache area 112a2 by the DMA 114a according to packets and transfers the write data 410 to the CM 110b by the DMA 114a via the DMA 114b. After the write data 410 is written to the cache area 112a2 and is transferred to the CM 110*b*, the storage apparatus 100 informs the host computer 300 that the write data 410 is written. The write data 410 transferred to the CM 110*b* is written to the cache area 112*b*2 by the DMA 114*b*. As a result, the write data 410 is stored both in the CM 110*a* and in the CM 110*b*.

Figure 12:
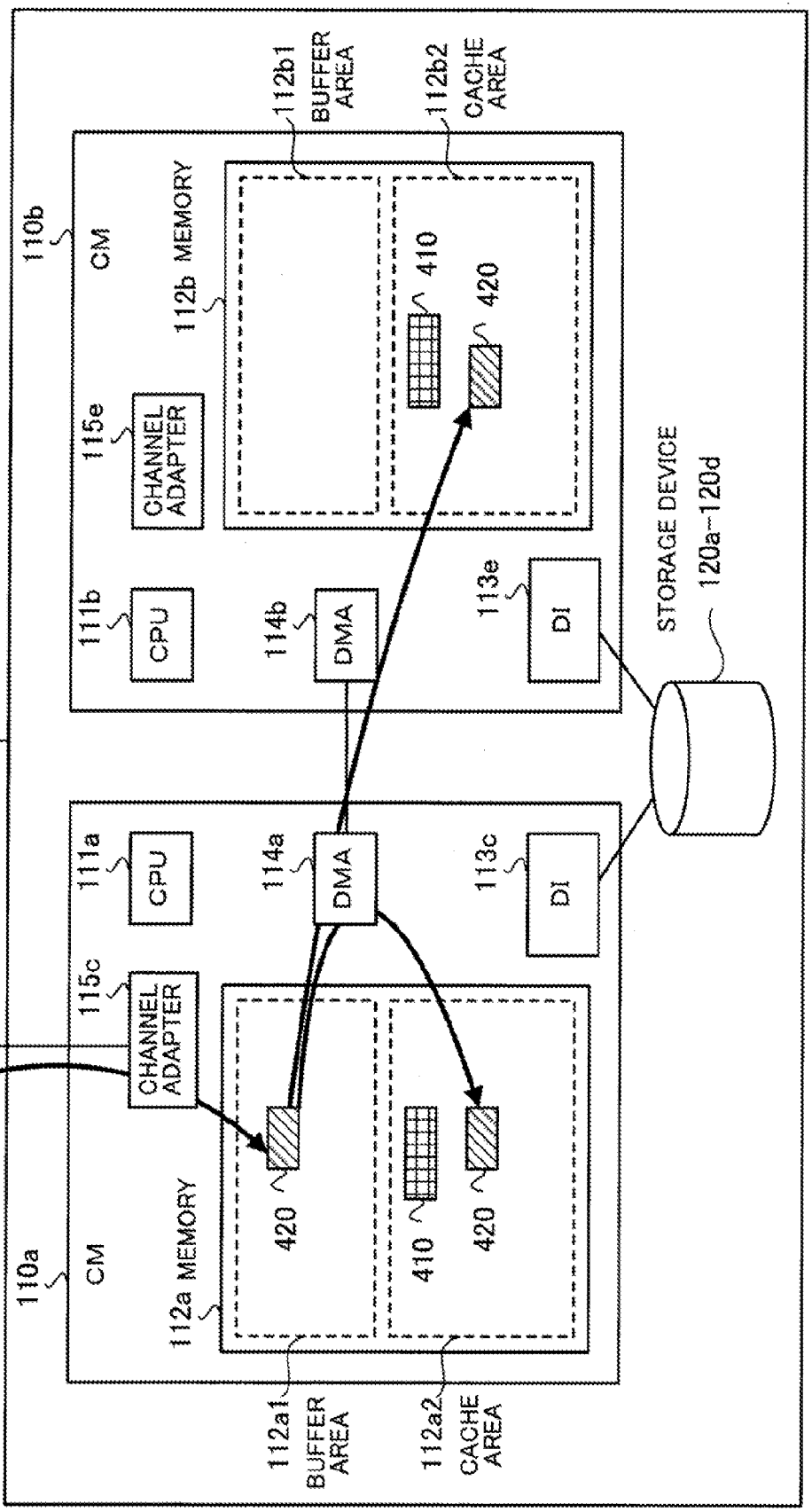
FIG. 12 illustrates operation in the second embodiment performed at the time of writing subsequent write data transmitted from the host computer to the cache area.

FIG. 12 illustrates operation in the second embodiment performed at the time of writing subsequent write data transmitted from the host computer to the cache area. As illustrated in FIG. 12, the storage apparatus 100 according to the second embodiment is connected to the host computer 300 and includes the CMs 110*a* and 110*b* and the storage devices 120*a* through 120*d*. This is the same in FIG. 11. The CM 110*a* includes the CPU 111*a*, the memory 112*a*, the device interface 113*c*, the DMA 114*a*, and the channel adapter 115*c*. The CM 110*b* includes the CPU 111*b*, the memory 112*b*, the device interface 113*e*, the DMA 114*b*, and the channel adapter 115*e*. The memory 112*a* includes the buffer area 112*a*1 and the cache area 112*a*2. The memory 112*b* includes the buffer area 112*b*1 and the cache area 112*b*2.

As illustrated in FIG. 12, it is assumed that in the state illustrated in FIG. 11, the storage apparatus 100 receives from the host computer 300 write data 420 for updating data stored in the storage devices 120*a* through 120*d*. In this case, it is assumed that the write data 410 and the write data 420 are used for updating the same update object data. Furthermore, it is assumed that a part or all of a portion of the update object data updated by the write data 420 overlaps with a part or all of a portion of the update object data updated by the write data 410. That is to say, if the write data 420 is considered as subsequent write data, then the write data 410 corresponds to previous write data. In this case, the storage apparatus 100 adds a check code to the received write data 420 by the channel adapter 115*c* according to packets, and writes the write data 420 to which the check codes are added to the buffer area 112*a*1. The storage apparatus 100 reads out by the DMA 114*a* the write data 420 stored in the buffer area 112*a*1. The storage apparatus 100 determines by the DMA 114*a* by the use of the check codes whether or not an error is detected in the write data 420 read out. If an error is not detected by the DMA 114*a*, then the storage apparatus 100 writes the write data 420 to the cache area 112*a*2 by the DMA 114*a* according to packets and transfers the write data 420 to the CM 110*b* by the DMA 114*a* via the DMA 114*b*. At this time the storage apparatus 100 writes the write data 420 by the DMA 114*a* to a free storage area of the cache area 112*a*2 other than a storage area in which the write data 410 is stored. The write data 420 transferred to the CM 110*b* is written to the cache area 112*b*2 by the DMA 114*b*. As a result, the write data 420 is stored both in the CM 110*a* and in the CM 110*b*.

Figure 13:
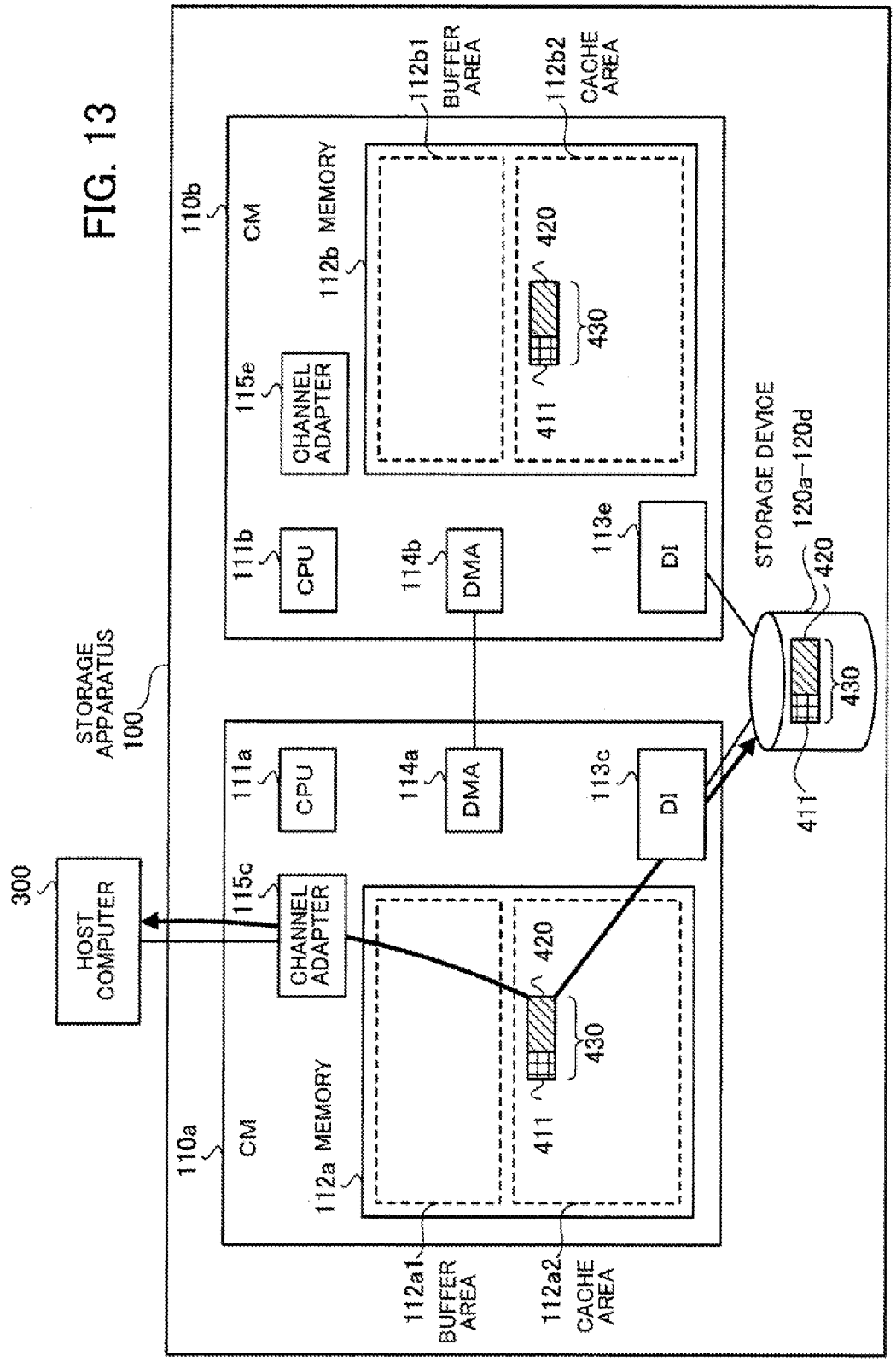
FIG. 13 illustrates operation in the second embodiment performed at the time of writing combined data obtained by combining the previous write data and the subsequent write data to a storage device.

FIG. 13 illustrates operation in the second embodiment performed at the time of writing combined data obtained by combining the previous write data and the subsequent write data to a storage device. As illustrated in FIG. 13, the storage apparatus 100 according to the second embodiment is connected to the host computer 300 and includes the CMs 110*a* and 110*b* and the storage devices 120*a* through 120*d*. This is the same in FIG. 11. The CM 110*a* includes the CPU 111*a*, the memory 112*a*, the device interface 113*c*, the DMA 114*a*, and the channel adapter 115*c*. The CM 110*b* includes the CPU 111*b*, the memory 112*b*, the device interface 113*e*, the DMA 114*b*, and the channel adapter 115*e*. The memory 112*a* includes the buffer area 112*a*1 and the cache area 112*a*2. The memory 112*b* includes the buffer area 112*b*1 and the cache area 112*b*2.

As illustrated in FIG. 13, it is assumed that in the state illustrated in FIG. 12, the storage apparatus 100 combines by the DMA 114*a* the write data 410 and the write data 420 stored in the cache area 112*a*2 to generate combined data 430. At this time the storage apparatus 100 generates the combined data 430 including differential data 411 which is a portion of the write data 410 and the write data 420 by performing a combination process 1 or 2. After the write data 420 is transferred to the CM 110*b* and the write data 410 and the write data 420 are combined, the storage apparatus 100 informs the host computer 300 that the write data 420 is written. At this time the write data 410 and the write data 420 stored in the cache area 112*b*2 are also combined by the DMA 114*b* in the CM 110*b* to generate the combined data 430. As a result, the combined data 430 is stored both in the CM 110*a* and in the CM 110*b*. In addition, the storage apparatus 100 updates the update object data stored in the storage devices 120*a* through 120*d* at a determined opportunity by the CPU 111*a* and the device interface 113*c* by the use of the combined data 430 stored in the cache area 112*a*2. By doing so, update by the differential data 411 (write data 410) and update by the write data 420 are reflected in the update object data stored in the storage devices 120*a* through 120*d*. The time when the amount of data stored in the cache area 112*a*2 exceeds a determined threshold or a determined ratio, the time when after the amount of data stored in the cache area 112*a*2 exceeds a determined threshold or a determined ratio, a determined period of time elapses, or any other time can be set as the determined opportunity. In addition, for example, the time when a margin for a process is left in the storage apparatus 100 may be set as the determined opportunity.

Figure 14:
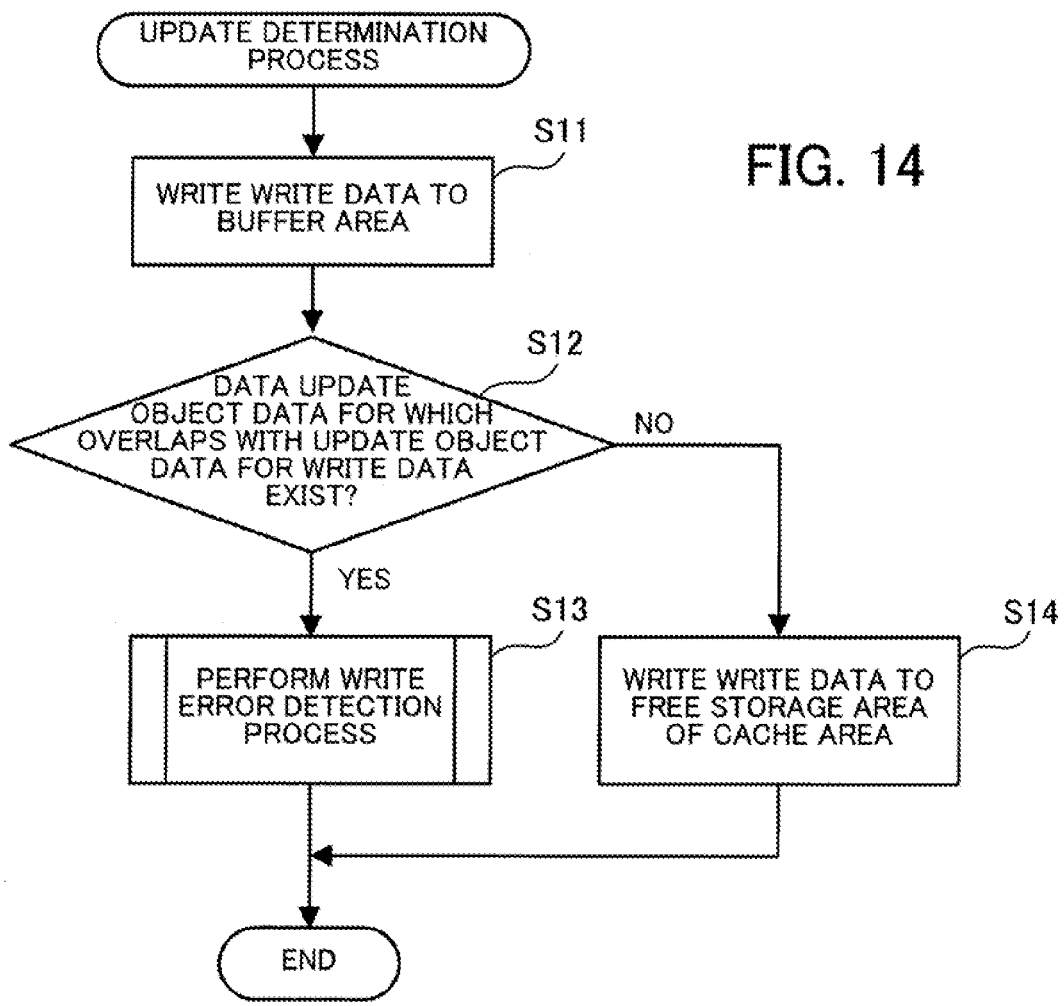
FIG. 14 is a flow chart of an update determination process in the second embodiment.

FIG. 14 is a flow chart of an update determination process in the second embodiment. It is assumed that the storage apparatus 100 according to the second embodiment receives from the host computer 300 write data which the CM 110*a* stores in the storage devices 120*a* through 120*d*. In this case, the storage apparatus 100 temporarily writes the received write data to the buffer area 112*a*1 and performs an update determination process for determining whether or not data for updating the same data has already been written to the cache area 112*a*2. The update determination process indicated in FIG. 14 will now be described in order of step number.

(Step S11) When the control section 116*a* receives the write data transmitted from the host computer 300, the control section 116*a* writes the received write data to the buffer area 112*a*1.

(Step S12) The control section 116*a* refers to a cache management table 112*a*31 stored in an execution area 112*a*3, and determines whether or not there is write data in the cache area 112*a*2 at least a part of update object data for which overlaps with update object data for the received write data. If there is write data in the cache area 112*a*2 at least a part of update object data for which overlaps with the update object data for the received write data (YES in step S12), then the control section 116*a* proceeds to step S13. On the other hand, if there is no write data in the cache area 112*a*2 at least a part of update object data for which overlaps with the update object data for the received write data (NO in step S12), then the control section 116*a* proceeds to step S14.

(Step S13) The control section 116*a* performs a write error detection process for determining whether or not an error occurs at the time of writing the write data written to the buffer area 112*a*1 in step S11 to a free storage area of the cache area 112*a*2. The write error detection process will be described later in FIG. 15 in detail. After that, the process terminates.

(Step S14) The control section 116*a* writes the write data written to the buffer area 112*a*1 in step S11 to a free storage area of the cache area 112*a*2. At this time the control section 116a sets a control register for the write data. The write data written to the free storage area of the cache area 112a2 is used for updating the update object data stored in the storage devices 120a through 120d. After that, the process terminates.

Figure 15:
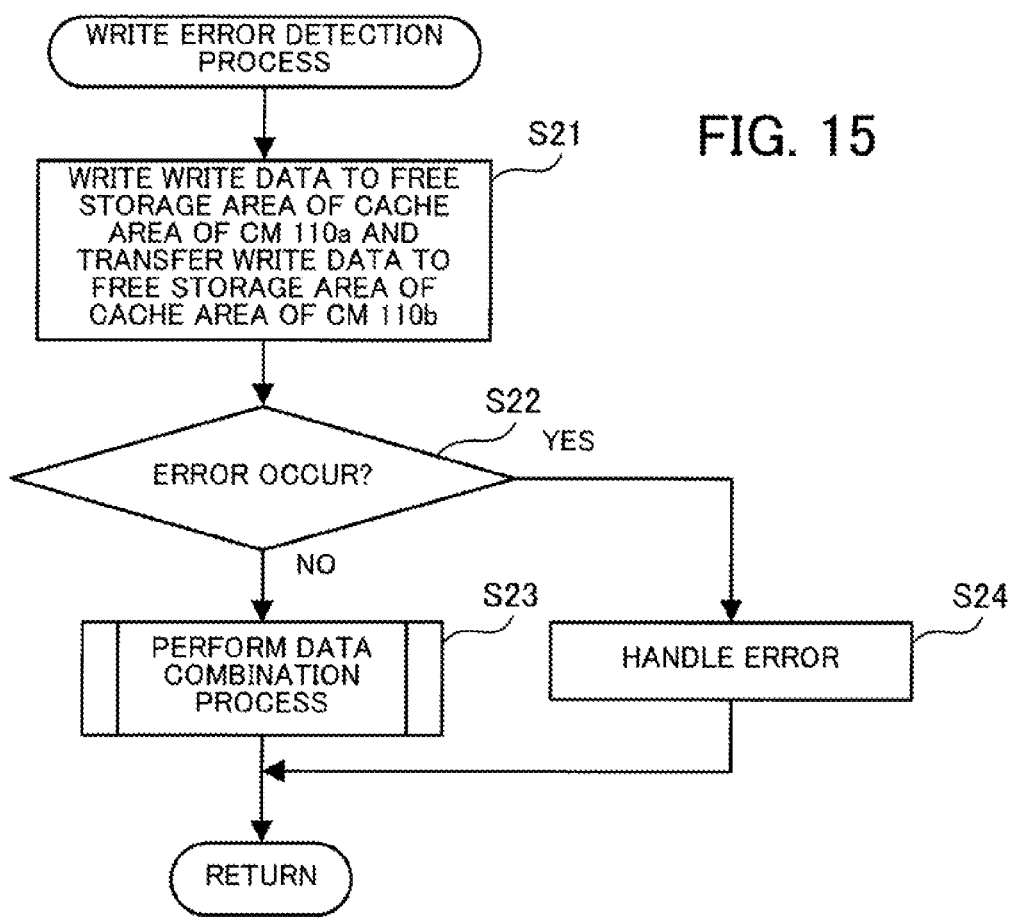
FIG. 15 is a flow chart of a write error detection process in the second embodiment.

FIG. 15 is a flow chart of the write error detection process in the second embodiment. If the determination that there is data in the cache area 112a2 for updating the same update object data is made in the update determination process, then the storage apparatus 100 according to the second embodiment performs the write error detection process for writing the write data to a free storage area of the cache area 112a2 of the CM 110a. The write error detection process indicated in FIG. 15 will now be described in order of step number.

(Step S21) The control section 116a writes the write data to a free storage area of the cache area 112a2 of the CM 110a. In addition, the control section 116a transfers the write data to the CM 110b. The CM 110b writes the transferred write data to a free storage area of the cache area (not illustrated). The write data transferred to the CM 110b is processed in the same way that is used by the CM 110a for processing the write data.

(Step S22) The control section 116a determines whether or not an error occurs at the time of writing the write data to the cache area 112a2 is step S21. If an error occurs (YES in step S22), then the control section 116a proceeds to step S24. On the other hand, if an error does not occur (NO is step S22), then the control section 116a proceeds to step S23.

(Step S23) The control section 116a performs a data combination process for combining the data in the cache area 112a2 which is detected in step S12 and which is used for updating the same update object data and the write data written to the cache area 112a2 in step S21. The data combination process will be described later in FIG. 16 in detail. After that, the process returns to the update determination process.

(Step S24) The control section 116a handles the error which occurs as a result of the writing in step S21. In this case, the control section 116a may physically erase or logically invalidate the write data in which the error occurs to free the storage area. Alternatively, the control section 116a may give the host computer 300 notice of the error in the write data. In response to the notice of the error, the host computer 300 may retransmit the write data and instructions to write it. Furthermore, even if the write error occurs, an error may not occur in corresponding writing in the CM 110b and combination may be performed in the CM 110b. In this case, the control section 116a may acquire combined data from the CM 110b. At this time the control section 116a may update the update object data stored in the storage devices 120a through 120d by the acquired combined data. After that, the process returns to the update determination process.

Figure 16:
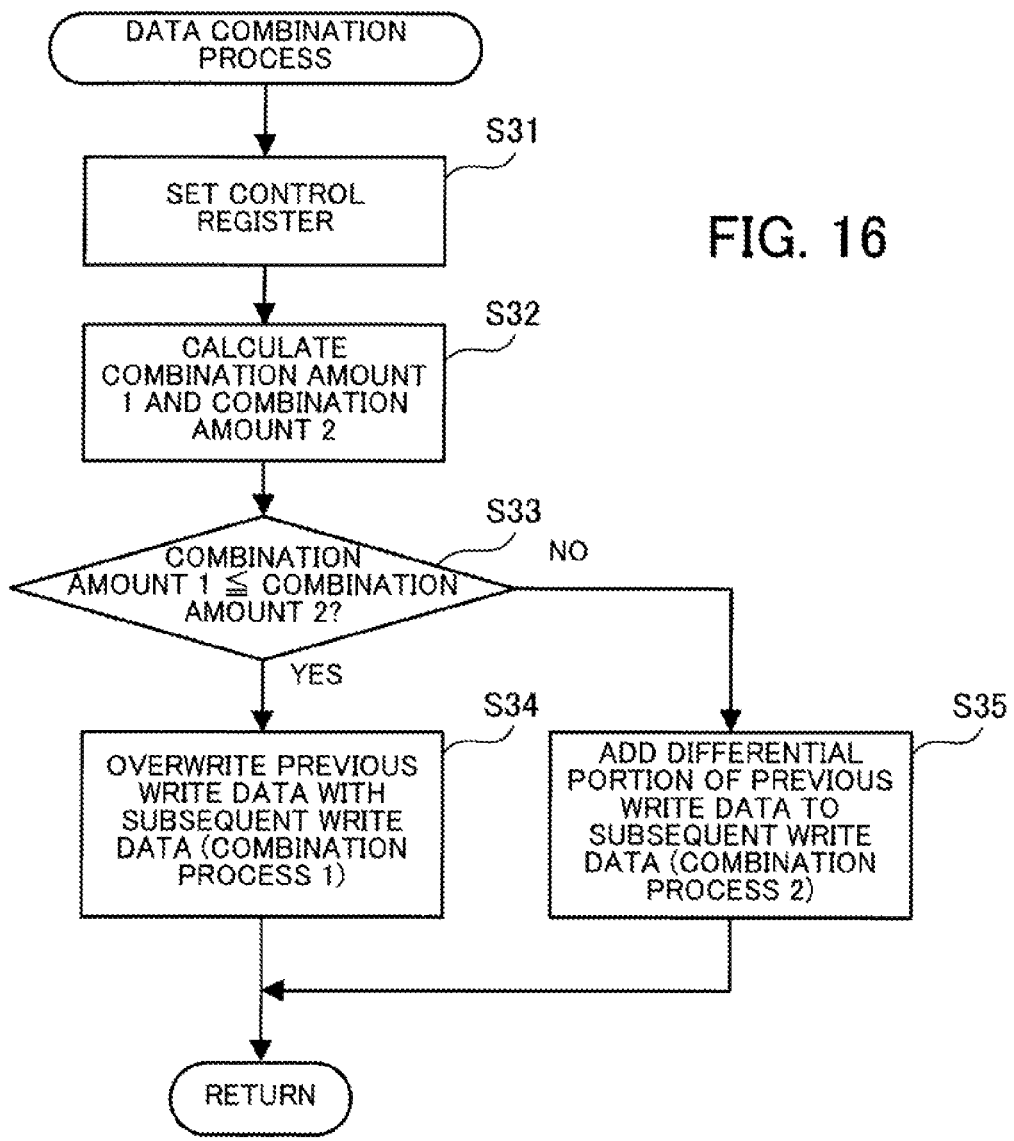
FIG. 16 is a flow chart of a data combination process in the second embodiment.

FIG. 16 is a flow chart of the data combination process in the second embodiment. If the determination that an error does not occur is made in the write error detection process, then the storage apparatus 100 according to the second embodiment compares data write amounts and performs the data combination process for combining previous write data and subsequent write data by a combination process which is smaller in data write amount. The data combination process indicated in FIG. 16 will now be described in order of step number.

(Step S31) The control section 116a sets a control register for write data. At this time the control section 116a sets a control register for the subsequent write data written to the cache area 112a2. It is assumed that a control register for the previous write data is set in step S14 of the update determination process.

(Step S32) The control section 116a calculates a combination amount 1 and a combination amount 2. The combination amount 1 is a write amount at the time of performing a combination process 1 for writing the subsequent write data to a storage area in which the previous write data is stored. The combination amount 2 is a write amount at the time of performing a combination process 2 for adding a differential portion of the previous write data to the subsequent write data.

A method for calculating the combination amount 1 and the combination amount 2 will be described.

The combination amount 1 is a write amount at the time of writing the subsequent write data to the storage area of the cache area 112a2 in which the previous write data is stored (combination process 1). As a result, the combination amount 1 is equal to the size of the subsequent write data, so the combination amount 1 can be indicated by DMA size in the control register 116a1 at the time of writing the subsequent write data. Furthermore, the combination amount 1 may be acquired from the size of the write data stored in the storage area of the cache area 112a2.

The combination amount 2 is a write amount at the time of writing the differential portion of the previous write data not updated by the subsequent write data to a storage area of the cache area 112a2 in which the subsequent write data is stored to add the differential portion to the subsequent write data (combination process 2). Accordingly, the combination amount 2 is the data amount of the differential portion of the previous write data. The combination amount 2 can be calculated, for example, by $$\text{combination amount } 2 = \text{combination amount } 2A + \text{combination amount } 2B \quad (1)$$

where combination amount 2A is calculated by the use of values for the subsequent write data set in the control register 116a1 and the following equations and inequality:

$$\text{combination amount } 2A1 = (\text{merge leading address}) - (\text{write cache leading address } A) \quad (2)$$

$$\text{combination amount } 2A2 = (\text{DMA destination address}) - (\text{write cache leading address } B) \quad (3)$$

If $$\text{combination amount } 2A1 < \text{combination amount } 2A2 \quad (4)$$

then it is assumed that combination amount 2A is calculated by the use of equation (5) described later. If inequality (4) is not satisfied, then it is assumed that combination amount 2A is defined by equation (6) described later.

$$\text{combination amount } 2A = \text{combination amount } 2A2 - \text{combination amount } 2A1 \quad (5)$$

$$\text{combination amount } 2A = 0 \quad (6)$$

Furthermore, combination amount 2B is calculated by the use of values for the subsequent write data set in the control register 116a1 and the following equations and inequality:

$$\text{combination amount } 2B1 = (\text{write cache leading address } A + \text{write cache size}) - (\text{merge final address}) \quad (7)$$

$$\text{combination amount } 2B2 = (\text{write cache leading address } B + \text{write cache size}) - (\text{DMA destination address} + \text{DMA size}) \quad (8)$$

If $$\text{combination amount } 2B1 < \text{combination amount } 2B2 \quad (9)$$

then it is assumed that combination amount 2B is calculated by the use of equation (10) described later. If inequality (9) is not satisfied, then it is assumed that combination amount 2B is defined by equation (11) described later.

$$\text{combination amount } 2B = (\text{merge final address} - \text{write cache leading address } A) - (\text{DMA destination address} + \text{DMA size}) - (\text{write cache leading address } B)(=(\text{combination amount } 2B2) - \text{combination amount } 2B1)) \quad (10)$$

$$\text{combination amount } 2B = 0 \quad (11)$$

(Step S33) On the basis of the results of the calculation in step S32, the control section 116a compares the combination amount 1 and the combination amount 2. If the combination amount 2 is larger than or equal to the combination amount 1 (YES in step S33), then the control section 116a proceeds to step S34. On the other hand, if the combination amount 2 is smaller than the combination amount 1 (NO in step S33), then the control section 116a proceeds to step S35.

(Step S34) The control section 116a performs the combination process 1 for overwriting the previous write data with the subsequent write data. After that, the process returns to the write error detection process.

(Step S35) The control section 116a performs the combination process 2 for adding the differential portion of the previous write data to the subsequent write data. After that, the process returns to the write error detection process.

The above storage apparatus 100 according to the second embodiment can prevent, at the time of updating previous write data, the previous write data from being updated by subsequent write data including an error.

Furthermore, when the storage apparatus 100 combines previous write data and subsequent write data, the storage apparatus 100 can overwrite the previous write data with the subsequent write data by the combination process 1. By doing so, a combination amount can be reduced if the size of the subsequent write data is smaller than the size of a differential portion of the previous write data. As a result, the load on the storage apparatus 100 can be reduced and the probability that an error will occur due to the combination can be reduced.

In addition, when the storage apparatus 100 combines previous write data and subsequent write data, the storage apparatus 100 can add a differential portion of the previous write data to the subsequent write data by the combination process 2. By doing so, a combination amount can be reduced if the size of the differential portion of the previous write data is smaller than the size of the subsequent write data. As a result, the load on the storage apparatus 100 can be reduced and the probability that an error will occur due to the combination can be reduced.

Moreover, the storage apparatus 100 calculates the combination amount 1 and the combination amount 2 and selects and performs one of the combination processes 1 and 2 which is smaller in write amount on the basis of a comparison result. Accordingly, the storage apparatus 100 can perform one of the combination processes 1 and 2 which is smaller in write amount. As a result, the load on the storage apparatus 100 can be reduced and an increase in the probability of the occurrence of an error due to a write process can be checked.

In addition, the channel adapter 115c adds a check code in advance to write data written to the cache area 112a2, and the control section 116a determines on the basis of the check code whether or not an error occurs. By doing so, the control section 116a can determine whether or not an error occurs at the time of writing to the cache area 112a2.

Furthermore, update object data stored in the storage devices 120a through 120d is updated by combined data obtained by combining previous write data and subsequent write data. As a result, the number of times the storage devices 120a through 120d is written can be reduced and an increase in the load on the storage apparatus 100 can be checked.

Moreover, combination is also performed in the CM 110b by the same processes and the like that are performed in the CM 110a. As a result, combined data is generated both in the CM 110a and in the CM 110b. This makes it possible to cope with, for example, the occurrence of an error in the CM 110a.

In addition, if a write error occurs at the time of writing subsequent write data, combination is not performed and the subsequent write data is deleted. Accordingly, previous write data can be held and there is no need to retransmit the previous write data. As a result, an increase in the load on the storage apparatus 100 can be checked.

Furthermore, if a write error occurs at the time of writing subsequent write data, notice of the occurrence of the error is given to the host computer 300. Accordingly, the host computer 300 retransmits the subsequent write data. As a result, a processing delay in the storage apparatus 100 or the host computer 300 can be prevented.

Modification of the Second Embodiment

A modification of the second embodiment will now be described. The difference between the second embodiment and a modification of the second embodiment will mainly be described and description of the same matters will be omitted. A storage apparatus according to a modification of the second embodiment differs from the storage apparatus 100 according to the second embodiment in that if the determination that an error occurs is made in a write error detection process and an error does not occur in a second CM, it acquires combined data from the second CM.

Figure 17:
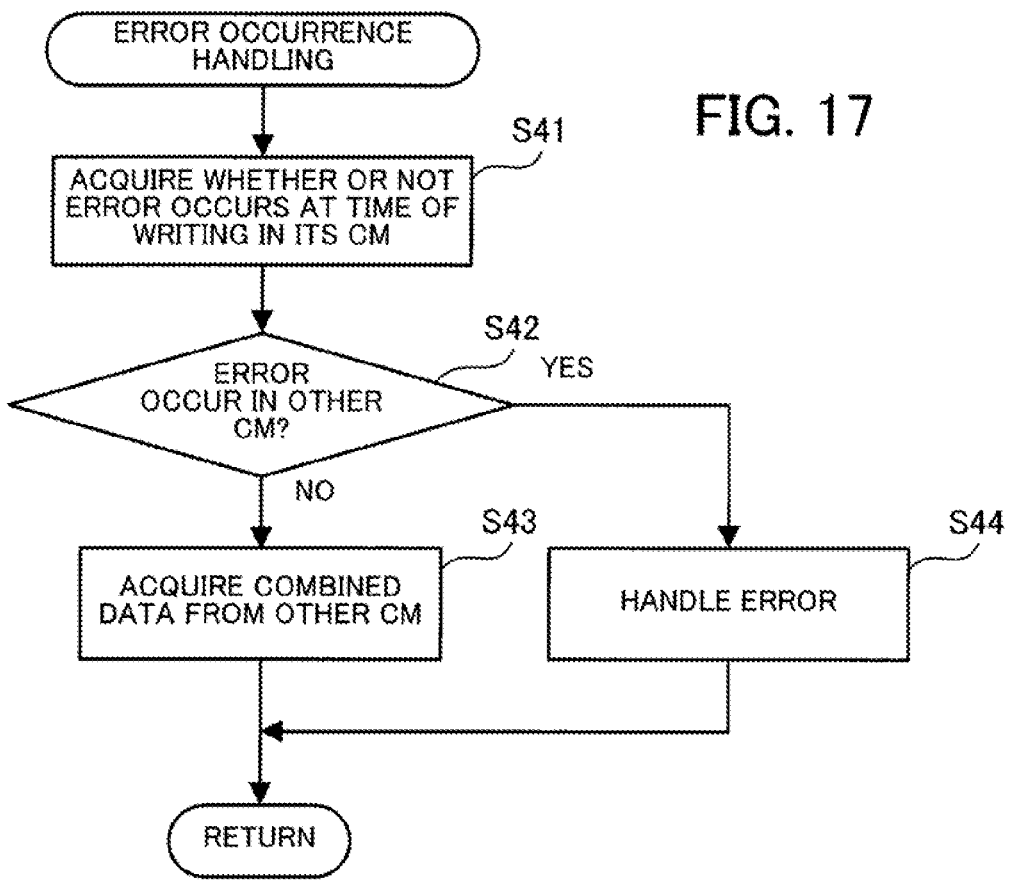
FIG. 17 is a flow chart of error occurrence handling in a modification of the second embodiment.

FIG. 17 is a flow chart of error occurrence handling in the modification of the second embodiment. If the determination that an error occurs is made in a write error detection process and an error does not occur in a second CM, a storage apparatus 100 according to the modification of the second embodiment performs error occurrence handling for acquiring combined data from the second CM. The error occurrence handling indicated in FIG. 17 will now be described in order of step number.

(Step S41) The control section 116a acquires whether or not an error occurs at the time of writing write data to a free storage area of a cache area 112a2 in a CM 110b.

(Step S42) On the basis of the result acquired in step S41, the control section 116a determines whether or not an error occurs at the time of writing in a CM 110b. If an error occurs (YES in step S42), then the control section 116a proceeds to step S44. On the other hand, if an error does not occur and data combination is performed in the CM 110b (NO in step S42), then the control section 116a proceeds to step S43.

(Step S43) The control section 116a acquires combined data from the CM 110b and writes the acquired combined data to the cache area 112a2. The combined data written to the cache area 112a2 is used for updating update object data stored in storage devices 120a through 120d connected to the CM 110a. After that, the process terminates.

(Step S44) The control section 116a handles the error which is detected in the write error detection process and which occurs in the write data written in the CM 110b. In this case, the control section 116a may delete or logically invalidate the write data to free the storage area. Alternatively, the control section 116a may give a host computer 300 notice of the error in the write data. On the basis of the notice of the error, the host computer 300 may retransmit the write data and instructions to write the write data. After that, the process returns to an update determination process.

With the above storage apparatus 100 according to the modification of the second embodiment the same effect that is obtained in the second embodiment can be achieved. In addition, even if an error occurs at the time of writing subsequent write data in the CM 110a, combined data generated in the CM 110b can be acquired. As a result, if the error occurs at the time of writing the subsequent write data in the CM 110a and an error does not occur in the CM 110b, update object data stored in the storage devices 120a through 120d can be updated by the combined data generated in the CM 110b.

According to the disclosed storage apparatus, control apparatus, and storage apparatus control method, it is possible to avoid updating data at data update time by data including an error.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage apparatus comprising:
a controller that:
writes, at the time of receiving a request to update at least a part of first data stored in a first storage area by at least a part of second data, the second data to a second storage area other than the first storage area,
determines whether or not a write error occurs,
compares, when the write error does not occur, a first write amount if the controller performs a first combination process for writing the second data to the first storage area with a second write amount if the controller performs a second combination process for writing a differential portion of the first data other than an update portion to the second storage area,
selects one of the first combination process and the second combination process on the basis of a comparison result, and
performs the selected combination process.

2. The storage apparatus according to claim 1 further comprising an addition device which adds a check code to the second data to be written to the second storage area, wherein when the control section writes the second data to the second storage area, the control section determines on the basis of the added check code whether or not the write error occurs.

3. The storage apparatus according to claim 1 further comprising a storage device, wherein:
the first data is used for updating a first portion of corresponding data stored in the storage device;
the second data is used for updating a second portion of the corresponding data; and
the controller updates the first portion of the corresponding data and the second portion of the corresponding data by combined data.

4. The storage apparatus according to claim 1, wherein when the write error occurs, the controller does not combine the first data and the second data and deletes the second data.

5. The storage apparatus according to claim 1, wherein when the write error occurs, the controller gives notice of occurrence of the write error.

6. The storage apparatus according to claim 1, wherein the controller selects based on the comparison result a process that requires a smaller write amount among the first combination process and the second combination process, and performs the selected combination process.

7. The storage apparatus according to claim 3, wherein:
the corresponding data is updated by the first data and is then updated by the combined data; and
the first portion overlaps at least in part with the second portion.

8. The storage apparatus according to claim 1 further comprising a cache memory which includes the first storage area and the second storage area,
wherein the controller:
determines whether or not a storage area included in the cache memory is free; and
selects the second storage area on the basis of a determination result.

9. A control apparatus comprising:
a controller that:
writes, at the time of receiving a request to update at least a part of first data stored in a first storage area by at least a part of second data, the second data to a second storage area other than the first storage area,
determines whether or not a write error occurs,
compares, when the write error does not occur, a first write amount if the controller performs a first combination process for writing the second data to the first storage area with a second write amount if the controller performs a second combination process for writing a differential portion of the first data other than an update portion to the second storage area,
selects one of the first combination process and the second combination process on the basis of a comparison result,
performs the selected combination process, and
updates data that is stored in a storage device and that corresponds to the first data and the second data by data obtained by the selected combination process.

10. A control method of controlling a storage apparatus, the control method comprising:
writing, at the time of receiving a request to update at least a part of first data stored in a first storage area by at least a part of second data, the second data to a second storage area other than the first storage area, and determining whether or not a write error occurs;
comparing, when the write error does not occur, a first write amount if a first combination process for writing the second data to the first storage area is performed with a second write amount if a second combination process for writing a differential portion of the first data other than an update portion to the second storage area is performed,
selecting one of the first combination process and the second combination process on the basis of a comparison result, and
performing the selected combination process.

11. A storage apparatus comprising:
a first controller that:
stores first data in a first storage area,
transmits the first data to a second controller,
writes, at the time of receiving a request to update at least a part of the first data by at least a part of second data, the second data to a second storage area other than the first storage area,
transmits the second data to the second controller,
determines whether or not a write error occurs, combines, when the write error does not occur, the first data and the second data, and acquires, when the write error occurs, third data from the second controller, and the second controller that:

receives the first data from the first controller, and generates, when the second data is received from the first controller, the third data by combining the first data received from the first controller and the second data received from the first controller.

* * * * *